(12) United States Patent (10) Patent No.: US 7,738,545 B2
Giannakis et al. (45) Date of Patent: Jun. 15, 2010

(54) PULSE SHAPER DESIGN FOR ULTRA-WIDEBAND COMMUNICATIONS

(75) Inventors: Georgios B. Giannakis, Minnetonka, MN (US); Liuqing Yang, Gainesville, FL (US); Xiliang Luo, Minneapolis, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 1610 days.

(21) Appl. No.: 10/952,713

(22) Filed: Sep. 29, 2004

(65) Prior Publication Data

US 2005/0105594 A1 May 19, 2005

Related U.S. Application Data

(60) Provisional application No. 60/507,303, filed on Sep. 30, 2003.

(51) Int. Cl.
*H03H 7/30* (2006.01)
*H03H 7/38* (2006.01)

(52) U.S. Cl. ...................... 375/229; 375/232
(58) Field of Classification Search .......... 375/229–236
See application file for complete search history.

(56) References Cited

U.S. PATENT DOCUMENTS

| | | | | |
|---|---|---|---|---|
| 5,375,146 | A * | 12/1994 | Chalmers | 375/350 |
| 6,545,532 | B1 * | 4/2003 | Maalej et al. | 329/304 |
| 6,834,073 | B1 | 12/2004 | Miller et al. | |
| 6,959,032 | B1 | 10/2005 | Richards et al. | |
| 7,031,371 | B1 | 4/2006 | Lakkis | |
| 7,194,019 | B2 * | 3/2007 | Dowla et al. | 375/147 |
| 7,228,325 | B2 * | 6/2007 | Willson et al. | 708/490 |
| 7,305,057 | B1 * | 12/2007 | Miao | 375/350 |
| 2002/0168026 | A1 * | 11/2002 | Khoini-Poorfard | 375/303 |
| 2003/0108133 | A1 * | 6/2003 | Richards | 375/351 |
| 2003/0147655 | A1 | 8/2003 | Shattil | |
| 2003/0231714 | A1 * | 12/2003 | Kjeldsen et al. | 375/259 |
| 2004/0086001 | A1 * | 5/2004 | Miao et al. | 370/516 |

(Continued)

OTHER PUBLICATIONS

Z. Wang et al., "Block Precoding for MUI/ISI-Resilient Generalized Multicarrier CDMA with Multirate Capabilities," IEEE Transactions on Communications, vol. 49, No. 11, pp. 2016-2027, Nov. 2001.

(Continued)

*Primary Examiner*—David C Payne
*Assistant Examiner*—Linda Wong
(74) *Attorney, Agent, or Firm*—Shumaker & Sieffert, P.A.

(57) ABSTRACT

The invention provides an ultra-wideband (UWB) transmitter and various techniques for generating digitally filtered UWB pulses that substantially maximize power and bandwidth in one or more frequency bands while allowing narrow-band interference (NBI) to be avoided, e.g. interference to and from wireless local area networks (WLANs). In particular, the UWB transmitter utilizes a digital filter to generate digitally filtered UWB pulses to substantially maximize power and bandwidth in the Federal Communications Commission (FCC) spectral mask for UWB communications. In one embodiment, the invention provides a method comprising generating digitally filtered ultra-wide band (UWB) pulses to substantially maximize power in one or more frequency bands of a UWB spectrum and to substantially reduce power in one or more NBI frequency bands of the UWB spectrum. The invention may be implemented without modifying the analog components of existing UWB transmitters.

53 Claims, 15 Drawing Sheets

U.S. PATENT DOCUMENTS

| | | | |
|---|---|---|---|
| 2004/0174770 A1* | 9/2004 | Rees | 367/7 |
| 2004/0208157 A1* | 10/2004 | Sander et al. | 370/345 |
| 2004/0233858 A1 | 11/2004 | Karaoguz | |
| 2004/0233972 A1 | 11/2004 | Karaoguz | |
| 2004/0264585 A1* | 12/2004 | Borran et al. | 375/260 |
| 2005/0001684 A1* | 1/2005 | Braithwaite | 330/263 |
| 2005/0141460 A9 | 6/2005 | Currivan et al. | |
| 2006/0285607 A1* | 12/2006 | Strodtbeck et al. | 375/298 |

OTHER PUBLICATIONS

F. Ramirez-Mireles et al., "System Performance Analysis of Impulse Radio Modulation," Procedings Radio Wireless Conference, Colorado Springs, CO, pp. 67-70, Aug. 1998.

M. Win et al., "Ultra-Wide Bandwidth Time-Hopping Spread-Spectrum Impulse Radio for Wireless Multiple-Access Communications," IEEE Transactions on Communications, vol. 48, No. 4, pp. 679-691, Apr. 2000.

A. Saleh et al., "A Statistical Model for Indoor Multipath Propagation," IEEE Journal on Selected Areas in Communications, vol. SAC-5, No. 2, pp. 128-137, Feb. 1987.

B. Hassibi et al., "On the Expected Complexity of Sphere Decoding," Proceedings of the Asilomar Conference on Signals, Systems and Computers, vol. 2, pp. 1051-1055, 2001.

B. Hochwald et al., "Unitary Space-Time Modulation for Multiple-Antenna Communications in Rayleigh Flat Fading," IEEE Transactions on Information Theory, vol. 46, No. 2, pp. 543-564, Mar. 2000.

C. Le Martret et al., "All-Digital PPM Impulse Radio for Multiple-Access Through Frequency-Selective Multipath," Procedures of GLOBECOM, vol. 1, pp. 22-26, San Francisco, CA, Nov. 17-Dec. 1, 2000.

C.J. Le Martret et al., "All-Digital Impulse Radio with Multiuser Detection for Wireless Cellular Systems," IEEE Transactions on Communications, vol. 50, No. 9, pp. 1440-1450, Sep. 2002.

C.J. Le Martret et al., "All-Digital PAM Impulse Radio for Multiple-Access Through Frequency-Selective Multipath," Procedure of Sensor Array and Multichannel Signal Processing Workshop, Boston, pp. 77-81, Mar. 2000.

D. Cassioli et al., "Performance of Low-Complexity Rake Reception in a Realistic UWB Channel," 2002 IEEE International Conference on Communications, pp. 763-767, New York City, N.Y., Apr. 28-May 2, 2002.

E. Homier et al., "Rapid Acquisition of Ultra-Wideband Signals in the Dense Multipath Channel," G.E Research Development Center, Technical Information Series, pp. 105-109, Jan. 2002.

F. Gini et al., "Frequency Offset and Symbol Timing Recovery in Flat-Fading Channels: A Cyclostationary Approach," IEEE Transactions On Communications, vol. 46, No. 3, pp. 400-411, Mar. 1998.

F. Ramirez-Mireles et al., "Multiple Access With Time-Hopping and Block Waveform PPM Modulation," 1998 IEEE International Conference on Communications, vol. 2 of 3, pp. 775-779, Atlanta, Georgia, Jun. 1998.

G. Leus et al., "MUI-Free Receiver for a Synchronous DS-CDMA System Based on Block Spreading in the Presence of Frequency-Selective Fading," IEEE Transactions on Signal Processing, vol. 48, No. 11, pp. 3175-3188, Nov. 2000.

G.B. Giannakis et al., "AMOUR-Generalized Multicarrier Transceivers for Blind CDMA Regardless of Multipath," IEEE Transactions on Communciations, vol. 48, No. 12, pp. 2064-2076, Dec. 2000.

H. Lee et al., "Multipath Characteristics of Impulse Radio Channels," 2000 IEEE 51$^{st}$ Vehicular Technology Conference Proceedings, Tokyo, Japan, pp. 2487-2491, May 15-18, 2000.

J.D. Choi et al., "Performance of Autocorrelation Receivers for Ultra-Wideband Communications with PPM in Multipath Channels," 2002 IEEE Conference on Ultra Wideband Systems and Technologies, pp. 213-217, Baltimore, MD, USA, May 2002.

J.D. Choi et al., "Performance of Ultra-Wideband Communications With Suboptimal Receivers in Mulipath Channels," IEEE Journal on Selected Areas in Communications, vol. 20, No. 9, pp. 1754-1766, Dec. 2002.

J.K. Cavers, "An Analysis of Pilot Symbol Assisted Modulation for Rayleigh Fading Channels," IEEE Transactions On Vehicular Technology, vol. 40, No. 4, pp. 686-693, Nov. 1991.

J.R. Foerster, "The Effects of Multipath Interference on the Performance of UWB Systems in Indoor Wireless Channel," IEEE VTS 53$^{rd}$ Vehicular Technology Conference, vol. 2, pp. 1176-1180, Rhodes, Greece, May 6-9, 2001.

J.R. Foerster et al., "Ultra-Wideband Technology for Short- or Medium-Range Wireless Communications," Ultra-Wideband Technology for Short- or Medium-Range Wireless Communications, pp. 1-11, 2001.

K.Siwiak et al., "Ultra-Wide Band Radio: The Emergence of An Important New Technology," IEEE VTS 53$^{rd}$ Vehicular Technology Conference, vol. 2, pp. 1169-1172, Rhodes, Greece, May 6-9, 2001.

L. Yang et al., "Multistage Block-Spreading for Impulse Radio Multiple Access Through ISI Channels," IEEE Journal on Selected Areas in Communications, vol. 20, No. 9, pp. 1767-1777, Dec. 2002.

L. Yang et al., "Space-Time Coding for Impulse Radio," 2002 IEEE Conference on Ultra Wideband Systems and Technologies, pp. 235-239, Baltimore, MN, May 20-23, 2002.

L. Yang et al., "Impulse Radio Muliple Access Through ISI Channels With Multi-Stage Block-Spreading" 2002 IEEE Conference on Ultra Wideband Systems and Technologies, pp. 277-281, Baltimore, MD, May 21-23, 2002.

L. Yang et al., "Optimal Pilot Waveform Assisted Modulation for Ultrawideband Communications," IEEE Transactions on Wireless Communications, vol. 3, No. 4, pp. 1236-1249, Jul. 2004.

L. Yang et al., "Non-Data Aided Timing Acquisition of Ultra-Wideband Transmissions Using Cyclostationarity," 2003 IEEE International Conference on Acoustics, Speech and Signal Processing, Hong Kong, vol. IV of VI, pp. IV-121-IV124, Apr. 6-10, 2003.

M.Z. Win et al., "Impulse Radio: How it Works," IEEE Communications Letters, vol. 2, No. 2, pp. 36-38, Feb. 1998.

M.L. Welborn, "System Considerations for Ultra-Wideband Wireless Networks," 2001 IEEE Radio and Wireless Conference, pp. 5-8, Boston, MA, Aug. 19-22, 2001.

M.Z. Win et al., "On the Energy Capture of Ultrawide Bandwidth Signals in Dense Multipath Environments," IEEE Communications Letters, vol. 2, No. 9, pp. 245-247, Sep. 1998.

M.Z. Win et al., "Ultra-Wide Bandwidth Time-Hopping Spread-Spectrum Impulse Radio for Wireless Multiple-Access Communications," IEEE Transactions on Communications, vol. 48, No. 4, pp. 679-691, Apr. 2000.

M.Z. Win et al., "Virtual Path Analysis of Selective Rake Receiver in Dense Multipath Channels," IEEE Communications Letters, vol. 3, No. 11, pp. 308-310, Nov. 1999.

M.Z. Win et al., "ATM-Based TH-SSMA Network for Multimedia PCS," IEEE Journal on Selected Areas in Communications, vol. 17, No. 5, pp. 824-836, May 1999.

O. Wintzell et al., "On the Capacity of a Pulse-Position-Hopped CDMA System," IEEE Transactions On Information Theory, vol. 47, No. 6, pp. 2639-2644, Sep. 2001.

P. Withington, II et al., "An Impulse Radio Communciations System," Ultra-Wideband, Short-Pulse Electromagnetics, Brooklyn, NY, pp. 113-112, Oct. 1992.

R. Fleming et al., "Rapid Acquisition for Ultra-Wideband Localizers," 2002 IEEE Conference on Ultra Wideband Systems and Technologies, Balimore, MD, pp. 245-249, May 21-23, 2002.

R.A. Scholtz, "Multiple Access with Time-Hopping Impulse Modulation," Communications On The Move, Boston, MA, USA, pp. 447-450, Oct. 1993.

R.T. Hoctor et al., "An Overview of Delay-Hopped, Transmitted-Reference RF Communications," GE Research and Development Center, Technical Information Series, pp. 1-29, Jan. 2002.

S. Adireddy et al., "Optimal Placement of Training for Frequency-Selective Block-Fading Channels," IEEE Transactions On Information Theory, vol. 48, No. 8, pp. 2338-2353, Aug. 2002.

S. Ohno et al., "Optimal Training and Redundant Precoding for Block Transmissions with Application to Wireless OFDM," IEEE Transactions on Communications, vol. 50, No. 12, pp. 2113-2123, Dec. 2002.

S. Zhou et al., "Space-Time Coding with Maximum Diversity Gains Over Frequency-Selective Fading Channels," IEEE Signal Processing Letters, vol. 8, No. 10, pp. 269-272, Oct. 2001.

S. Zhou et al., "Chip-Interleaved Block-Spread Code Division Multiple Access," IEEE Transactions on Communications, vol. 50, No. 2, pp. 235-248, Feb. 2002.

S.M. Alamouti, "A Simple Transmit Diversity Technique for Wireless Communications," IEEE Journal On Selected Areas In Communications, vol. 16, No. 8, pp. 1451-1458, Oct. 1998.

S.S. Kolenchery et al., "A Novel Impulse Radio Network for Tactical Military Wireless Communications," Procedures Milcom Conference, Bedford, MA, 7 pages, Oct. 1998.

S.S. Kolenchery et al., "Performance of Local Power Control in Peer-to-Peer Impulse Radio Networks With Bursty Traffic," IEEE Global Telecommunications Conference, vol. 2 of 3, Phoenix, AZ, USA, pp. 910-916, Nov. 3-8, 1997.

U. Fincke et al., "Improved Methods For Calculating Vectors of Short Length in a Lattice, Including a Complexity Analysis," Mathematics of Computation, vol. 44, No. 170, pp. 463-471, Apr. 1985.

V. Lottici et al., "Channel Estimation for Ultra-Wideband Communciations," IEEE Journal on Selected Areas in Communications, vol. 20, No. 9, pp. 1638-1645, Dec. 2002.

V. Tarokh et al., "Space-Time Block Codes From Orthogonal Designs," IEEE Transactions on Information Theory, vol. 45, No. 5, pp. 1456-1467, Jul. 1999.

V. Tarokh et al., "Space-Time Codes for High Data Rate Wireless Communication: Performance Criterion and Code Construction," IEEE Transactions on Information Theory, vol. 44, No. 2, pp. 744-765, Mar. 1998.

W.M. Lovelace et al., "The Effects of Timing Jitter on the Performance of Impulse Radio," 2002 IEEE Conference on Ultra Wideband Systems and Technologies, pp. 251-254, Baltimore, MD, May 21-23, 2002.

X. Chen et al., "Monocycle Shapes for Ultra Wideband System," 2002 IEEE International Symposium on Circuits and Systems, vol. I of V, pp. I-597-I-600, Scottsdale, AZ, May 25-29, 2002.

Z. Tian et al., "Symbol Timing Estimation in Ultra-Wideband Communications," Procecures of $36^{th}$ Asilomar Conference on Signals, Systems, and Computers, Pacific Grove, CA, pp. 1924-1928, Nov. 3-6, 2002.

Z. Wang et al., "Wireless Multicarrier Communications: Where Fourier Meets Shannon," IEEE Signal Processing Magazine, vol. 47, No. 3, pp. 1-21, May 2000.

Z. Wang et al., "Vandermonde-Lagrange Mutually Orthogonal Flexible Transceivers for Blind CDMA in Unknown Multipath," Procedures of Workshop on Signal Processing Advances in Wireless Communication, Annapolis, MD, pp. 42-45, May 9-12, 1999.

B. Parr et al., "A Novel Ultra-Wideband Pulse Design Algorithm," IEEE Communications Letter, vol. 7, No. 5, pp. 219-221, May 2003.

J. Romme et al., "On the Power Spectral Density of Time-Hopping Impulse Radio," 2002 IEEE Conference on Ultra-Wideband Systems and Technologies, Wyndham Baltimore Inner Harbor, pp. 241-244, May 2002.

M.Z. Win, "Spectral Density of Random UWB Signals," IEEE Communications Letters, vol. 6, No. 12, pp. 526-528, Dec. 2002.

J. Han et al., "A New Ultra-Wideband, Ultra-Short Monocycle Pulse Generator with Reduced Ringing," IEEE Microwave and Wireless Components Letters, vol. 12, No. 6, pp. 206-208, Jun. 2002.

J.S. Lee et al., "New Uniplanar Subnanosecond Monocycle Pulse Generator and Transformer for Time-Domain Microwave Applications," IEEE Transactions on Microwave Theory and Techniques, vol. 49, No. 6, pp. 1126-1129, Jun. 2001.

T.W. Parks et al., "Chebyshev Approximation for Nonrecursive Digital Filters with Linear Phase," IEEE Transactions on Circuit Theory, vol. CT-19, No. 2, pp. 189-194, Mar. 1972.

D. Kelly et al., "PulsON Second Generation Timing Chip: Enabling UWB Through Precise Timing," 2002 IEEE Conference on Ultra-Wideband Systems and Technologies, Wyndham Baltimore Inner Harbor, pp. 117-121, May 2002.

X. Luo et al., "Designing Optimal Pulse-Shapers for Ultra-Wideband Radios," Journal of Communications and Networks, vol. 5, No. 4, pp. 344-353, Dec. 2003.

J.R. Foerster, "The Performance of a Direct-Sequence Spread Ultra-Wideband System in the Presence of Multipath, Narrowband Interference, and Multiuser Interference," 2002 IEEE Conference on Ultra Wideband Systems and Technologies, Wyndham Baltimore Inner Harbor, pp. 87-92, May 2002.

B.M. Sadler et al., "On the Performance of UWB and DS-Spread Spectrum Communication Systems," 2002 IEEE Conference on Ultra Wideband Systems and Technologies, Wyndham Baltimore Inner Harbor, pp. 289-292, May 2002.

R.A. Scholtz, "Multiple Access with Time-Hopping Impulse Modulation," Communications on the Move, Conference Record vol. 2 of 3, MILCOM Conference, Boston, MA, pp. 447-450, 1993.

L. Yang et al., "Multistage Block-Spreading for Impulse Radio Multiple Access Through ISI Channels," IEEE Journal on Selected Areas in Communications, vol. 20, No. 9, pp. 1767-1777, Dec. 2002.

Z. Wang, "Multi-Carrier Ultra-Wideband Multiple-Access with Good Resilience Against Multiuser Interference," 2003 Conference on Information Sciences & Systems, The John Hopkins University, Baltimore, MD, pp. 1-5, Mar. 2003.

D. Cassioli, et al., "Performance of Low-Complexity Rake Reception in a Realistic UWB Channel," 2002 IEEE International Conference on Communications, New York, NY, pp. 763-767, Apr. 28-May 2, 2002.

Z. Wang et al., "A Simple and General Parameterization Quantifying Performance in Fading Channels," IEEE Transactions on Communications, vol. 51, No. 8, pp. 1389-1398, Aug. 2003.

L. Yang et al., "Analog Space-Time Coding for Multiantenna Ultra-Wideband Transmissions," IEEE Transactions on Communications, vol. 52, No. 3, pp. 507-517, Mar. 2004.

I. Bergel et al., "Narrow-Band Interference Suppression in Time-Hopping Impulse-Radio Systems," 2002 IEEE Conference on Ultra Wideband Systems and Technologies, Wyndham Baltimore Inner Harbor, pp. 303-307, May 2002.

L. Yang et al., "Unification of Ultra-Wideband Multiple Access Schemes and Comparison in the Presence of Interference," The Thirty-Seventh Asilomar Conference on Signals, Systems & Computers, Pacific Grove, CA, pp. 1239-1243, Nov. 2003.

G. Durisi, et al., "Performance of TH and DS UWB Multiaccess Systems in Presence of Multipath Channel and Narrowband Interference," Procedure of International Workshop on Ultra Wideband Systems, Oulu, Finland, 5 pages, Jun. 2003.

Z. Wang et al., "Complex-Field Coding for OFDM Over Fading Wireless Channels,"IEEE Transactions on Information Theory, vol. 49, No. 3, pp. 707-720, Mar. 2003.

A.V. Oppenheim, et al., Discrete-Time Signal Processing, $2^{nd}$ Edition, Prentice Hall, Chapter 7, "Optimum Approximations of Fir Filters," pp. 486-511, 1999.

FCC Report and Order, In the Matter of Revision of Part 15 of the Commission's Rules Regarding Ultra-Wideband Trasmission Systems, FCC 02-48, pp. 7434-7553, Apr. 2002.

IEEE P802.15 Working Group for WPAN, Channel Modeling Sub-Committee Report Final, IEEE 802.15-02/368r5-SG3a, pp. 1-40, Nov. 2002.

L. Yang et al., "Digital-Carrier Multi-Band User Codes for Baseband UWB Multiple Access," Journal of Communications and Networks, vol. 5, No. 4, pp. 374-385, Dec. 2003.

M. Hamalainen et al., On the UWB System Coexistence With GSM900, UMTS/WCDMA, and GPS, IEEE Journal on Selected Areas in Communications, vol. 20, No. 9, pp. 1712-1721, Dec. 2002.

L. Zhao et al., "Performance of Ultra-Wideband Communications in the Presence of Interference," IEEE Journal on Selected Areas in Communications, vol. 20, No. 9, pp. 1684-1691, Dec. 2002.

S. Zhou et al., "Digital Multi-Carrier Spread Spectrum Versus Direct Sequence Spread Spectrum for Resistance to Jamming and Multipath," IEEE Transactions on Communications, vol. 50, No. 4, pp. 643-655, Apr. 2002.

P. Withington, "Impulse Radio Overview," Time Domain Corp., pp. 1-7, downloadable from http://user.it.uu.se/carle/Notes/UWB.pdf.

* cited by examiner

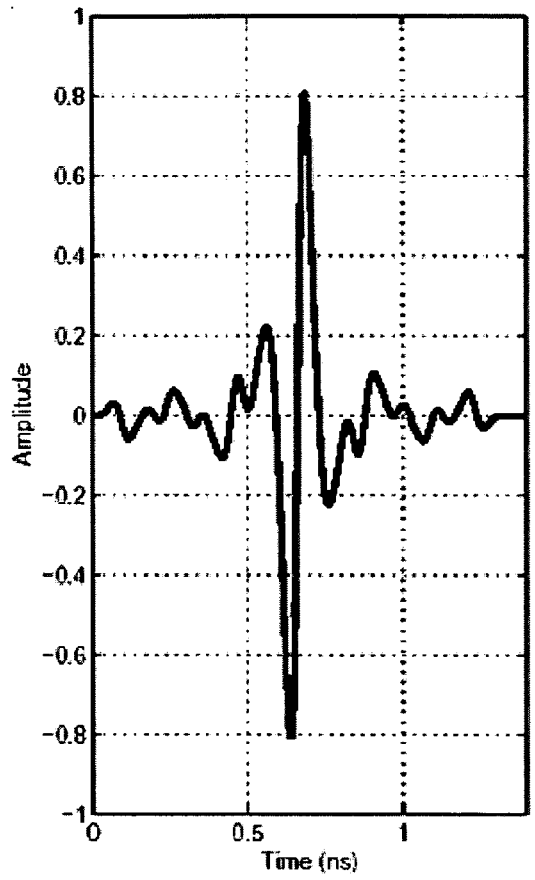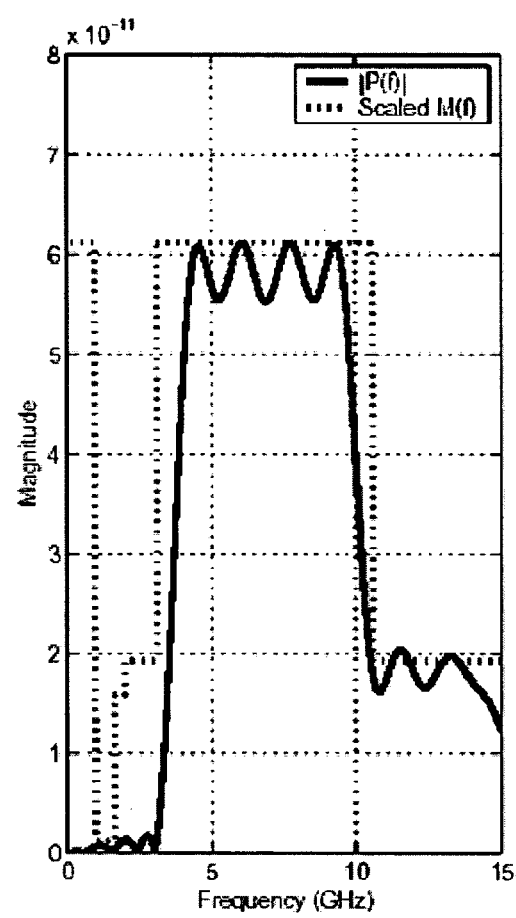
FIG. 10A FIG. 10B

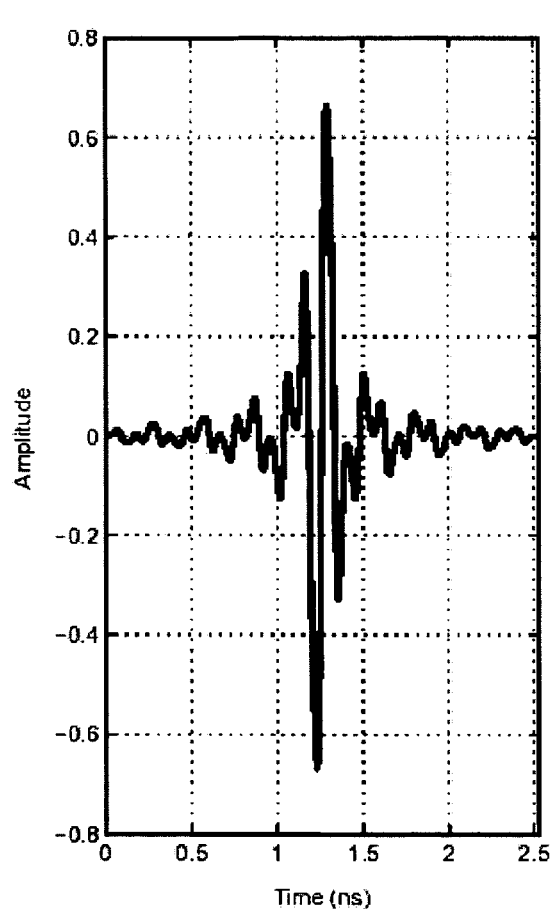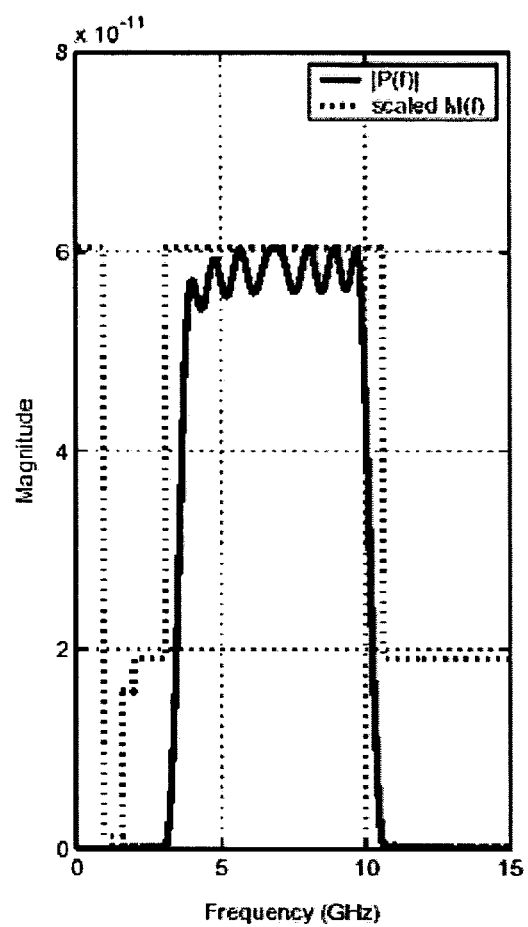
FIG. 11A　　　　　　FIG. 11B

PULSE SHAPER DESIGN FOR ULTRA-WIDEBAND COMMUNICATIONS

This application claims the benefit of U.S. Provisional Application Ser. No. 60/507,303, filed Sep. 30, 2003, the entire content of which is incorporated herein by reference.

STATEMENT REGARDING FEDERALLY SPONSORED RESEARCH OR DEVELOPMENT

This invention was made with Government support under University CUFS Number 522-6505, awarded by the Army Research Lab (ARL/CTA), and Contract No. DAAD19-01-2-011. The Government may have certain rights in this invention.

TECHNICAL FIELD

The invention relates to wireless communication systems and, more particularly, transmitters and receivers for use in wireless communications.

BACKGROUND

Ultra-wideband (UWB) communication has attractive features for tactical wireless communications, baseband multiple access, and multimedia services, especially in the area of short-range indoor wireless communications. In general, an UWB transmission consists of a train of very short pulses occupying an ultra-wide bandwidth. Utilizing pulses of duration on the order of a nanosecond, UWB transmissions enable rich multipath diversity. The information is typically encoded via either pulse position modulation (PPM) or pulse amplitude modulation (PAM). Additionally, UWB receivers are often carrier-free and can be implemented with low complexity in basedband operation. Several challenges, however, exist with respect to the generation of UWB pulses.

SUMMARY

In general, the invention is directed to pulse shaping devices and techniques that allow increased performance of ultra-wideband (UWB) communications by exploiting the spectral mask released by the Federal Communications Commission (FCC). In particular, an UWB transmitter is described that utilizes a digital filter in order to substantially maximize power and bandwidth in one or more frequency bands of the UWB spectrum. Unlike conventional UWB transmitters that utilize carrier modulation and/or baseband analog filtering, the described invention utilizes a digital filter to substantially maximize power and bandwidth in one or more frequency bands, e.g. defined by the Federal Communications Commission (FCC) spectral mask for UWB communications, and provides flexibility to avoid narrow-band interference (NBI). Additionally, the described invention provides techniques that can be implemented without modifying the analog components of existing UWB transmitters.

In accordance with an embodiment of the invention, digitally filtered UWB pulses are generated to substantially maximize the power and bandwidth within the FCC spectral mask for UWB communications. Additionally, the digitally filtered UWB pulses reduce power in approximately the 5 GHz frequency band to avoid NBI to and from wireless local area networks (WLAN) using the 802.11a standard. The digitally filtered UWB pulses may be properly generated by pre-selecting the spacing of a set of tap coefficients, and pre-selecting the set of tap coefficients based on the FCC spectral mask. The UWB pulses can be generated according to the selected coefficients in order to exploit the allocated UWB spectrum as defined by governmental regulation. In some embodiments, the Parks-McClellan algorithm for filter design is used to select the set of tap coefficients.

In one embodiment, the invention is directed to a method comprising generating digitally filtered ultra-wide band (UWB) pulses to substantially maximize power in one or more frequency bands of a UWB spectrum and to substantially reduce power in one or more narrow band interference (NBI) frequency bands of the UWB spectrum.

In another embodiment, the invention provides a digital filter of a UWB transmitter that generates digitally filtered UWB pulses to substantially maximize power in one or more frequency bands of a UWB spectrum and to substantially reduce power in one or more NBI frequency bands of the UWB spectrum In another embodiment, the invention provides a UWB transmitter comprising a symbol generator that generates a stream of information bearing symbols, a digital filter that digitally filters the stream of information bearing symbols according to a set of tap coefficients to substantially maximize power in one or more frequency bands of a UWB spectrum and to substantially reduce power in one or more NBI frequency bands of the UWB spectrum, a timer that processes the stream of information bearing symbols in accordance with a pulse position modulation (PPM) scheme, and a pulse generator that generates digitally filtered UWB pulses based on the digitally filtered stream of information bearing symbols.

In another embodiment, the invention is directed to a method comprising digitally filtering UWB pulses to reduce power in one or more NBI frequency bands of a governmentally defined UWB spectrum.

In another embodiment, the invention provides a digital filter of a UWB transmitter that reduces power of a UWB pulse in one or more NBI frequency bands of a governmentally defined UWB spectrum.

In another embodiment, the invention provides a UWB transmitter that includes a digital filter that reduces power of a UWB pulse in one or more NBI frequency bands of a governmentally defined UWB spectrum. The NBI frequency bands may correspond to governmentally regulated or licensed bands such as the 5 Ghz band, or may comprise other bands that include substantial interference. The invention provides great flexibility in adapting to changes in interference, or changes in governmental regulation of frequency bands within the UWB spectrum.

The invention may be capable of providing one or more advantages. For example, the invention provides pulse shaping devices and techniques for UWB transmissions that substantially maximize power and bandwidth within one or more frequency bands. In particular, the described invention substantially maximizes power and bandwidth for UWB transmissions in the FCC spectral mask by exploiting the mask and reducing power in areas where the mask substantially limits power. Moreover, converting conventional digital techniques into analog form requires digital-to-analog (D/A) operations at 64 GHz while the described techniques can be implemented without modifying the analog components of existing UWB transmitters.

Furthermore, unlike conventional UWB communication techniques that comply with the FCC spectral mask by pulse shaping the Gaussian monocycle through carrier modulation and/or baseband analog digital filtering, the described invention provides an UWB transmitter that includes a digital filter to generate digitally filtered UWB pulses that substantially maximize power and bandwidth within the FCC spectral mask. Carrier modulation relies on local oscillators at the transmitter and receiver and can be susceptible to carrier frequency offset/jitter (CFO/CFJ). Passing the Gaussian monocycle through a baseband analog filter can re-shape the pulse without introducing CFO/CFJ. However, digital filters are more accurate, highly linear, accurately repeatable, and provide greater flexibility than analog filters. Consequently, the described invention is not as susceptible to CFO/CFJ and allows greater flexibility for avoidance of narrowband interference that arises from co-existing narrow-band systems. Moreover, the described invention is not limited to the Gaussian monocycle. Rather, any analog pulse shaper may also be used with the techniques described herein.

In multi-band UWB systems, the described invention allows for frequency hopping (FH) which can improve system capacity and reinforces low probability of interception/detection (LPI/LPD) without being susceptible to multiple CFO/CFJs. Additionally, the described invention allows flexibility to avoid adjacent channel interference in multi-band UWB systems by confining the spectrum of each UWB channel within its prescribed band, while maximizing power and bandwidth within the FCC spectral mask.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 10A is a graph illustrating an exemplary design of the digital filter within the transmitter of FIG. 2 for single-band UWB communications.

FIG. 10B is a graph illustrating the Fourier Transform of the exemplary design of the digital filter in FIG. 9A.

FIG. 11A is a graph illustrating an alternative design of the digital filter within the transmitter of FIG. 2 for single-band UWB communications.

FIG. 11B is a graph illustrating the Fourier Transform of the design of the digital filter in FIG. 11A.

DETAILED DESCRIPTION

Ultra-wideband (UWB) communication has attractive features for tactical wireless communications, baseband multiple access, and multimedia services, especially in the area of short-range indoor wireless communications. In general, an UWB transmission consists of a train of very short pulses occupying an ultra-wide bandwidth. Utilizing pulses of duration on the order of a nanosecond, UWB transmissions enable rich multipath diversity. The information is typically encoded via either pulse position modulation (PPM) or pulse amplitude modulation (PAM). Additionally, UWB receivers are also carrier-free and can be implemented with low complexity in basedband operation.

The ultra-wide bandwidth includes some narrow bandwidths that are licensed from the Federal Communications Commission (FCC) for other communication purposes such as the global positioning system (GPS), federal aviation systems (FAS), and wireless local area networks (WLAN). The FCC has released a spectral mask that limits the equivalent isotropic radiated power (EIRP) spectrum density with which UWB communications are allowed to transmit. The short pulses of the UWB transmission appear as minimal noise to non UWB-systems within those licensed frequencies.

In order to realize the attractive features of UWB communication under this FCC regulation, UWB communication systems should operate below the noise floor and avoid interference to and from co-existing narrow-band systems while enabling frequency hopping (FH) among sub-bands of the ultra-wide bandwidth. All these requirements rely on the pulse shaper of the UWB transmitter. Since the transmit spectrum depends on the pulse shape at the output of the transmit antenna, the pulse shaper includes the aggregate effects of the on-chip pulse in cascade with the transmit antenna. However, the widely adopted Gaussian monocycle does not meet these requirements. Unless the pulse shaper adheres to the FCC mask in a power-efficient manner, simply lowering the transmit power to limit interference trades-off receive signal-to-noise ratio (SNR).

Typically two approaches are employed to design pulse shapers with desirable spectral properties: carrier modulation and/or baseband analog/digital filtering of the baseband pulse shaper. The former relies on local oscillators at the UWB transmitter and receiver. Consequently, such pulse UWB systems experience carrier frequency offset/jitter (CFO/CFJ). In multi-band UWB systems with frequency hopping (FH), multiple CFO/CFJ's emerge. Passing the Gaussian monocycle pulse through a baseband analog filter can re-shape the pulse without introducing CFO/CFJ. However, analog filters are not as flexible as digital filters which are very accurate, highly linear, and accurately repeatable.

Figure 1:
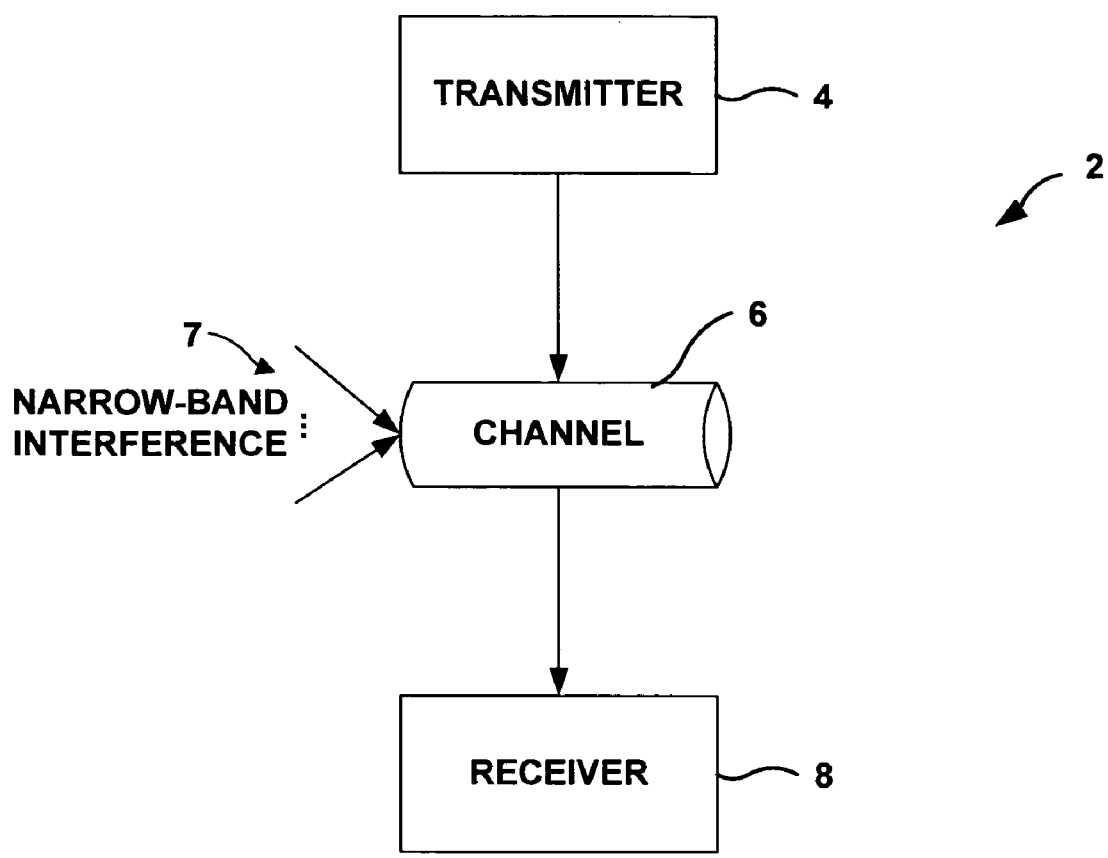
FIG. 1 is a block diagram illustrating an exemplary ultra-wideband (UWB) communication system in which a transmitter communicates with a receiver through a wireless channel.

FIG. 1 is a block diagram illustrating an exemplary ultra-wideband (UWB) communication system 2 in which a transmitter 4 communicates with a receiver 8 through a wireless channel 6. In accordance with the invention, pulse shaping techniques are applied in transmitter 4 to substantially maximize power and bandwidth in one or more frequency bands, e.g. the Federal Communications Commission (FCC) spectral mask for UWB communications, for UWB transmissions through wireless channel 6. UWB communication system 2 may be either single-band in order to use the entire UWB bandwidth from 3.1-10.6 GHz or multi-band to facilitate FH. Alternatively, UWB communication system 2 may utilize single-band UWB communication in selected frequency bands, i.e. 3.1-6.85 GHz, to facilitate lower cost and complexity implementations. Furthermore, transmitter 4 can allow avoidance of narrow-band interference (NBI) 7 in wireless channel 6 as well as provide efficient implementation of fast frequency hopping (FH) without invoking analog carriers.

Generally, transmitter 4 generates digitally filtered UWB pulses that substantially maximize power and bandwidth in one or more frequency bands, for example, in compliance with the FCC spectral mask for indoor UWB communications. In that case, the digitally filtered UWB pulses may have reduced power in one or more NBI frequency bands. For example, transmitter 4 may generate digitally filtered UWB pulses that reduce power in one or more NBI frequency bands, such as the 5 GHz which is used by wireless local area networks (WLAN) employing the 802.11a standard. In particular, transmitter 4 includes a digital filter comprising a set of tap coefficients that digitally filter the UWB pulse to substantially maximize power and bandwidth in one or more frequency bands. The spacing of the tap coefficients determines the number of coefficients in the set and effects complexity and performance of system 2. In some embodiments, the set of tap coefficients is pre-selected or defined according to the Parks-McClellan algorithm.

Moreover, unlike conventional digital designs that require digital-to-analog (D/A) conversion operations at 64 GHz, transmitter 4 can be implemented without modifying the analog components of existing UWB transmitters. Additionally, transmitter 4 and receiver 8 do not require local oscillators and, thus, system 2 is not subject to carrier frequency offset/jitter (CFO/CFJ). Receiver 8 may be a Rake receiver employing maximum ratio combining (MRC) to combine output of a plurality of Rake fingers.

The techniques described herein may be applied to uplink and/or downlink UWB transmissions, i.e., transmissions from a base station to a mobile device and vice versa. Consequently, transmitter 4 and receiver 8 may be any device configured to communicate using a wireless transmission including a distribution station, a hub for a wireless local area network, a mobile phone, a laptop or handheld computing device, a device within a wireless personal area network, a device within a sensor network, a personal digital assistant (PDA), or other device.

Figure 2:
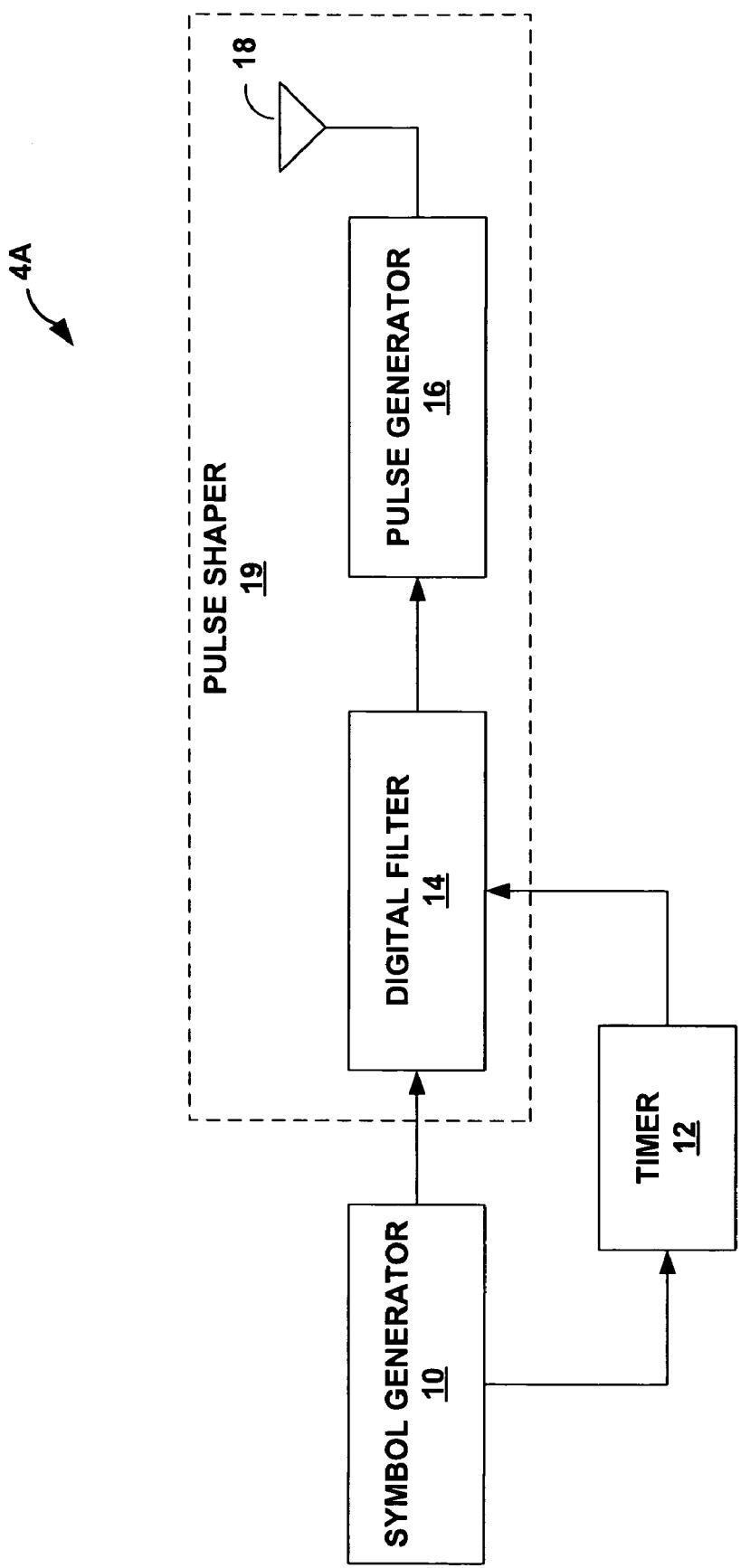
FIG. 2 is a block diagram illustrating one embodiment of the transmitter within the UWB wireless communication system of FIG. 1.

FIG. 2 is a block diagram illustrating in further detail one embodiment of transmitter 4, referred to as transmitter 4A, within UWB wireless communication system 2 in which transmitter 4A generates digitally filtered UWB pulses to substantially maximize power and bandwidth in the FCC spectral mask for UWB communications. In the illustrated embodiment, transmitter 4A comprises a symbol generator 10 that generates a stream of information bearing symbols, a timer 12, a digital filter 14, a pulse generator 16, and a transmit antenna 18. Digital filter 14 digitally filters the stream of information bearing symbols to substantially maximize the power in one or more frequency bands and reduce power in one or more NBI frequency bands. Timer 12 processes the stream of information symbols according to a pulse position modulation (PPM) scheme. Pulse generator 16 generates digitally filtered UWB pulses based on the PPM digitally filtered stream of information bearing symbols.

The techniques described herein can be implemented using currently available hardware. For example, timer 12 may maintain pico-second accuracy. Time Domain Corporation of Huntsville, Ala. has produced application specific integrated circuits (ASIC) timer modules using PulsON technology, which can provide the required pico-second accuracy. Additionally, transmitter 4A includes digital filter 14 and pulse generator 16. In some embodiments, digital filter 14 comprises a shift register that stores a set of tap coefficients. Pulse generator 16 may be an analog pulse generator that generates a Gaussian pulse, although the invention is not limited as such. In general, however, pulse generator 16 may be an analog pulse generator that generates any analog pulse shape, and may optionally include analog pulse shaping filters, if desired.

An overall pulse shaping effect (herein, "pulse shaping") may be represented as the aggregate effect of digital filter 14, pulse generator 16, and antenna 18. Consequently, pulse shaper 19 includes digital filter 14, pulse generator 16, and transmit antenna 18. In accordance with the invention an effective shape of the pulses following conversion to analog and analog shaping substantially exploits allocated power and frequency defined by a governmentally regulated mask associated UWB communication Wireless UWB communication system 2, including the transmitter structure, transmit spectrum, and pulse shaping effects, will be described herein through the analysis of a single user UWB communication system employing PPM. The analysis of a single user system serves as motivation to include the described pulse shaping techniques for both single and multi-user UWB communications.

In general, transmitter 4A conveys the stream of information bearing symbols as a stream of ultra-short pulses. Typical modulation in UWB communication systems is binary PPM in conjunction with time hopping (TH) codes that are used to enable multiple access (MA) and smooth the transmit-spectra. The transmitted waveform from transmitter 4A, i.e. u(t), is given according to equation (1) with p(t) representing pulse shaper 19 and the energy transmitted per pulse given according to equation (2).

$$u(t) = \sum_k \sqrt{\frac{\varepsilon}{\varepsilon_p}} \, p(t - kT_f - c_k T_c - s(\lfloor k/N_f \rfloor)\Delta) \quad (1)$$

$$\epsilon_p := \int p^2(t) dt \quad (2)$$

The frame duration $T_f$ in equation (1) includes $N_c$ chips, $c_k \in [0, N_c-1]$ is the $N_f$-1 periodic TH sequence, $T_c$ is the chip period, s(n) represents the information bearing symbol, and Δ represents the PPM modulation index. With k indexing frames in equation (1), each information bearing symbol is transmitted over $N_f$ frames, which results in floor operation $\lfloor k/N_f \rfloor$ and implies that the effective symbol duration is $T_s := N_f T_f$. In order to implement TH, each frame is divided into $N_c$ chips, each of duration $T_c$, i.e., $T_f = N_c T_c$. As a result, the symbol level pulse shaper is given according to equation (3) where the transmitted signal can be rewritten according to equation (4).

$$p_s(t) = \sum_{k=0}^{N_f-1} \frac{1}{\sqrt{\varepsilon_p}} p(t - kT_f - c_k T_c) \quad (3)$$

$$u(t) = \Sigma_n \sqrt{\varepsilon} p_s(t - nT_s - s(n)\Delta) \quad (4)$$

The transmit spectrum, i.e., the power spectrum density (PSD) of u(t), can be calculated according to equation (5) where $P_s(f)$ is the Fourier Transform (FT) of $p_s(t)$. The frequency support of $p_s(t)$ is determined by the pulse shaper p(t) and its shape depends on the specific TH code $c_k$. Based on equation (3) and (5), it can be verified that equation (5) can be rewritten according to equation (6) where $\rho_1(f)$ is given according to equation (7).

$$\Phi_{uu}(f) = \varepsilon \frac{1}{T_s} \quad (5)$$

$$|P_s(f)|^2 \left[ \frac{1-\cos(2\pi\Delta f)}{2} + \frac{1+\cos(2\pi\Delta f)}{2T_s} \sum_{n=-\infty}^{+\infty} \delta\left(f - \frac{k}{T_s}\right) \right]$$

$$\Phi_{uu}(f) = \frac{\varepsilon}{\varepsilon_p} \frac{1}{T_f} |P(f)|^2 \rho_1(f) \quad (6)$$

$$\rho_1(f) := \left[ \frac{1-\cos(2\pi\Delta f)}{2} + \frac{1+\cos(2\pi\Delta f)}{2T_s} \sum_{n=-\infty}^{+\infty} \delta\left(f - \frac{k}{T_s}\right) \right] \quad (7)$$

$$\frac{\left| \sum_{k=0}^{N_f-1} e^{-j2\pi fkT_f} e^{-j2\pi fc_k T_c} \right|^2}{N_f}$$

Equation (6) is a special case of the power spectral density described in J. Romme and L. Piazzo, "On the Power Spectral Density of Time-Hopping Impulse Radio," in Proceedings of IEEE Conference on Ultra-Wideband Systems and Technologies at Baltimore, Md., May 2003 pp. 219-221, which is incorporated herein by reference, where a general PSD expression allowing even for long deterministic TH codes is derived. When $C_k$'s in equation (1) are integer-valued, independent, and uniformly distributed over $[0, N_c-1]$ as in M. Z. Win, "Spectral Density of Random UWB Signals," IEEE Communications Letters, Vol. 6, No. 12, December 2002, pp. 526-528, which is incorporated herein by reference, the PSD coincides with equation (6) but $\rho_1$ is replaced by $\rho_2(f)$, which is given according to equation (8).

$$\rho_2(f) = 1 - \frac{1+\cos(2\pi\Delta f)}{2} \left| \frac{\sin(\pi f T_c N_c)}{\sin(\pi f T_c)} \right|^2 \frac{1}{N_c^2} + \quad (8)$$

$$\frac{1+\cos(2\pi\Delta f)}{2} \frac{1}{T_f} \sum_{k=-\infty}^{+\infty} \delta\left(f - \frac{k}{T_c}\right)$$

Although $\rho_1(f)$ and $\rho_2(f)$ contain spectral spikes, the severity of interference from UWB transmissions to co-existing systems depends on average power, which entails integration of the PSD over the frequency band, e.g. $[f_1, f_2]$, in which the victim system(s) transmit. For this reason, $\rho_1(f)$ and $\rho_2(f)$ can be approximated according to equation (9) where $f_1, f_2$ are two frequencies satisfying $f_1 - f_2 > 1/T_f$. In other words, it is possible to approximate the equivalent isotropically radiated power (EIRP) spectrum of a single UWB transmitter according to equation (10).

$$\int_{f_1}^{f_2} \rho_a(f) df \int_{f_1}^{f_2} 1 df = f_2 - f_1 \quad (9)$$

$$\Phi_{EIRP}(f) \cong \frac{\varepsilon}{\varepsilon_p} \frac{|P(f)|^2}{T_f} \quad (10)$$

Figure 7:
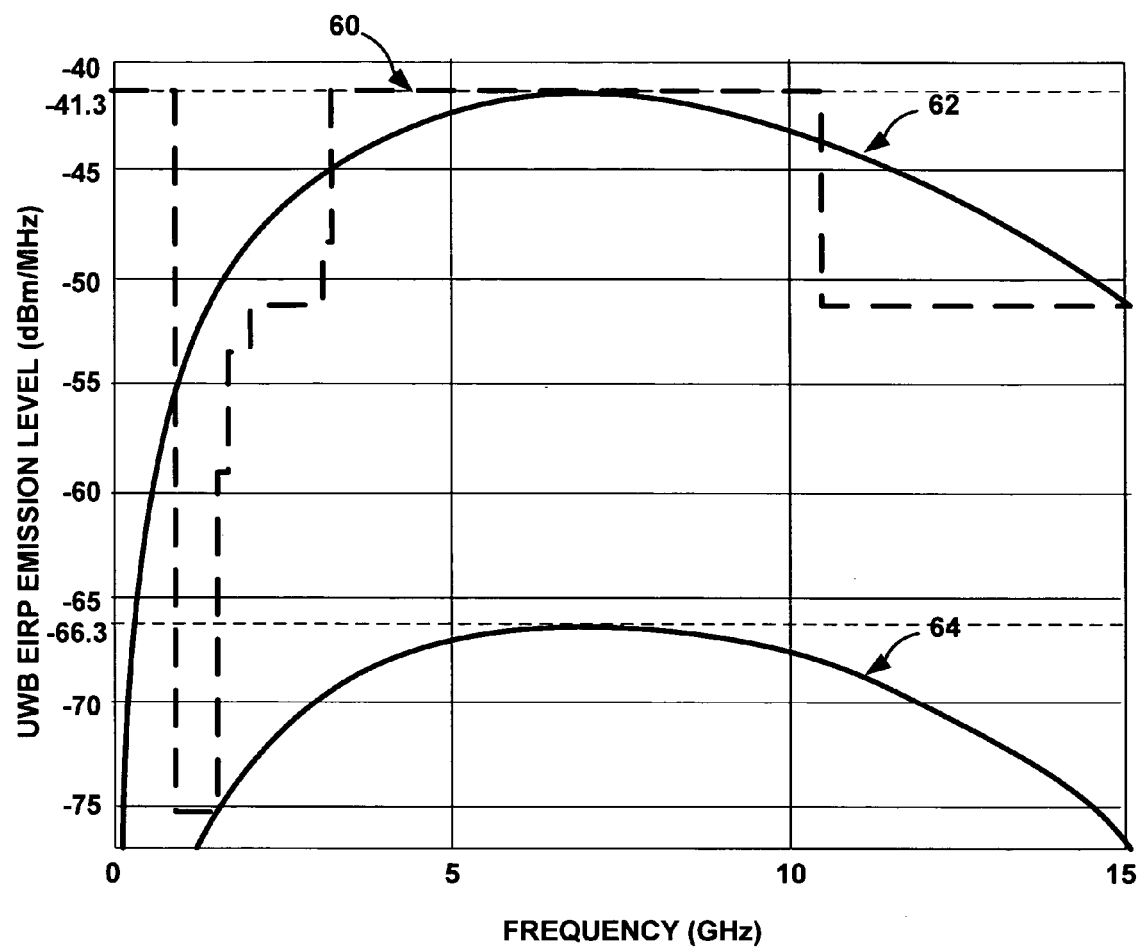
FIG. 7 is a graph illustrating the Federal Communications Commission (FCC) spectral mask for UWB communication systems, output of a system having a power spectral density (PSD) that violates the FCC spectral mask, and output of a conventional system having a PSD that satisfies the FCC spectral mask.

The FCC currently requires that the EIRP spectra emitted by indoor UWB communication systems must adhere to the FCC defined spectral mask, illustrated in FIG. 7. In order to satisfy the FCC power emission limit, the EIRP must remain below the FCC spectral mask. Clearly, the EIRP can be kept below the FCC spectral mask for any p(t) by confining $\in$ to sufficiently low values. In other words, any pulse shaper can be adapted to adhere to the FCC mask in a power-efficient manner simply lowering the transmit power. However, lowering the transmit power is undesirable because symbol detection performance depends on the signal-to-noise ratio (SNR), which is proportional to the transmit power. Therefore, it is desirable to design pulse shaper 19 to allow for efficient exploitation of the FCC spectral mask, i.e. maximization of power and bandwidth.

Before introducing pulse shaper designs, the widely adopted Gaussian pulse is first considered. With the Gaussian pulse as the input, the UWB antenna acts as a differentiator to produce the first derivative of the Gaussian pulse, also referred to as the Gaussian monocycle, at the output of the transmit antenna 18. Since the transmit spectrum depends on the pulse shape at the output of transmit antenna 18, pulse shaper 19 includes the aggregate effects of digital filter 14 and pulse generator 16 in cascade with antenna 18. The Gaussian monocycle can be expressed according to equation (11) where $\tau_g$ represents the time between its minimum and maximum values and A represents the peak amplitude of the Gaussian monocycle. The pulse duration is approximately $T_g = 4\tau_g$. Accordingly, the FT of equation (11) is given according to equation (12) where $f_g := 1/(\Pi \tau_g)$ represents the frequency where $|G(f)|$ is maximum.

$$g(t) = 2\sqrt{e} \, A \frac{t}{\tau_g} e^{-2\left(\frac{t}{\tau_g}\right)^2} \quad (11)$$

$$G(f) = \frac{1}{2} \sqrt{\frac{2e}{\pi}} \frac{Af}{f_g^2} e^{\frac{1}{2}\left(\frac{f}{f_g}\right)^2} \quad (12)$$

By substituting the Gaussian monocycle into equation (1), the transmit EIRP spectrum is illustrated in FIG. 7 with two values of transmission power: a prohibitively high power that does not meet the FCC spectral mask and a sufficiently low power that meets the FCC spectral mask. Maximizing the transmission power violates the FCC spectrum mask while trying to conform to the FCC mask at the forbidden band does not exploit the FCC mask in a power efficient manner. Consequently, the Gaussian monocycle does not substantially utilize the power and bandwidth of the spectrum assigned by the FCC. Moreover, utilization of the entire bandwidth entails circuits and processors with very large frequency response. The advantage of using the entire bandwidth, however, may not always be desirable due to the increasingly lossy nature of high frequency bands. Therefore, it may be desirable to use only a fraction of the entire bandwidth, which can also facilitate NBI suppression. Importantly, partitioning the entire bandwidth and allowing each user to utilize only a fraction of the entire bandwidth enables MA via FH.

Although the pulse generators described in J. Han and C. Nguyen "A New Ultra-Wideband, Ultra-short Monocycle Pulse Generator with Reduced Ringing," IEEE Microwave and Wireless Components Letters, Vol. 12, No. 6, June 2002, pp. 206-208, and J. S. Lee et al. "New Uniplanar Subnanosecond Monocycle Pulse Generator and Transformer for Time-Domain Microwave Applications," IEEE Transaction on Microwave Theory and Techniques," Vol. 49, No. 6, June 2001, pp. 1126-1139, which are incorporated herein by reference, are readily implementable, the Gaussian monocycle does not provide such capability and flexibility unless it is employed after some processing. Generally, pulse shaper 19 is designed to output digitally filtered UWB pulses that substantially maximize power and bandwidth in the FCC spectral mask although the invention is not limited in this respect.

For example, pulse shaper 19 may be designed to output UWB pulses that maximize power in one or more frequency bands as previously described. Pulse shaper 19 may generate UWB pulses that maximize power within a selected frequency band of the FCC spectral mask in order to facilitate FH or reduce cost and/or complexity. Furthermore, pulse shaper 19 is not limited to processing, i.e. digitally filtering, the Gaussian pulse. Rather, digital filter 14 processes the stream of information bearing symbols to maximize power and bandwidth in one or more frequency bands while pulse generator 16 may generate any UWB pulse. In other words, digital filter 14 is designed so that the digitally filtered UWB pulses output by pulse generator 16 substantially maximize power and bandwidth in one or more frequency bands. Consequently, the output of pulse shaper 19, i.e. the output at transmit antenna 18, is a stream of digitally filtered UWB pulses with desirable spectral characteristics.

Therefore, pulse shaper 19 is designed to generate digitally filtered UWB pulses with desirable spectral characteristics, i.e. maximized power and bandwidth over the transmitted frequency bands and reduced power in one or more NBI frequency bands. The transmit EIRP spectrum is directly related to P(f). In order to utilize the FCC spectral mask efficiently, the magnitude |P(f)| needs to closely approximate the shape of the spectral mask, which translates to a desired magnitude profile $P_d(f)$. It will be shown below that $P_d(f)$ can be selected to satisfy any desirable specifications. The following exemplary design of pulse shaper 19 p(t) is described given the Gaussian monocycle g(t). The shape of g(t) is uniquely determined by $\tau_g$ or, equivalently $f_g$, and the desired FT magnitude $P_d(f)$ so that |P(f)| approximates $P_d(f)$ in some meaningful sense, i.e. power and bandwidth efficiency.

Figure 8:
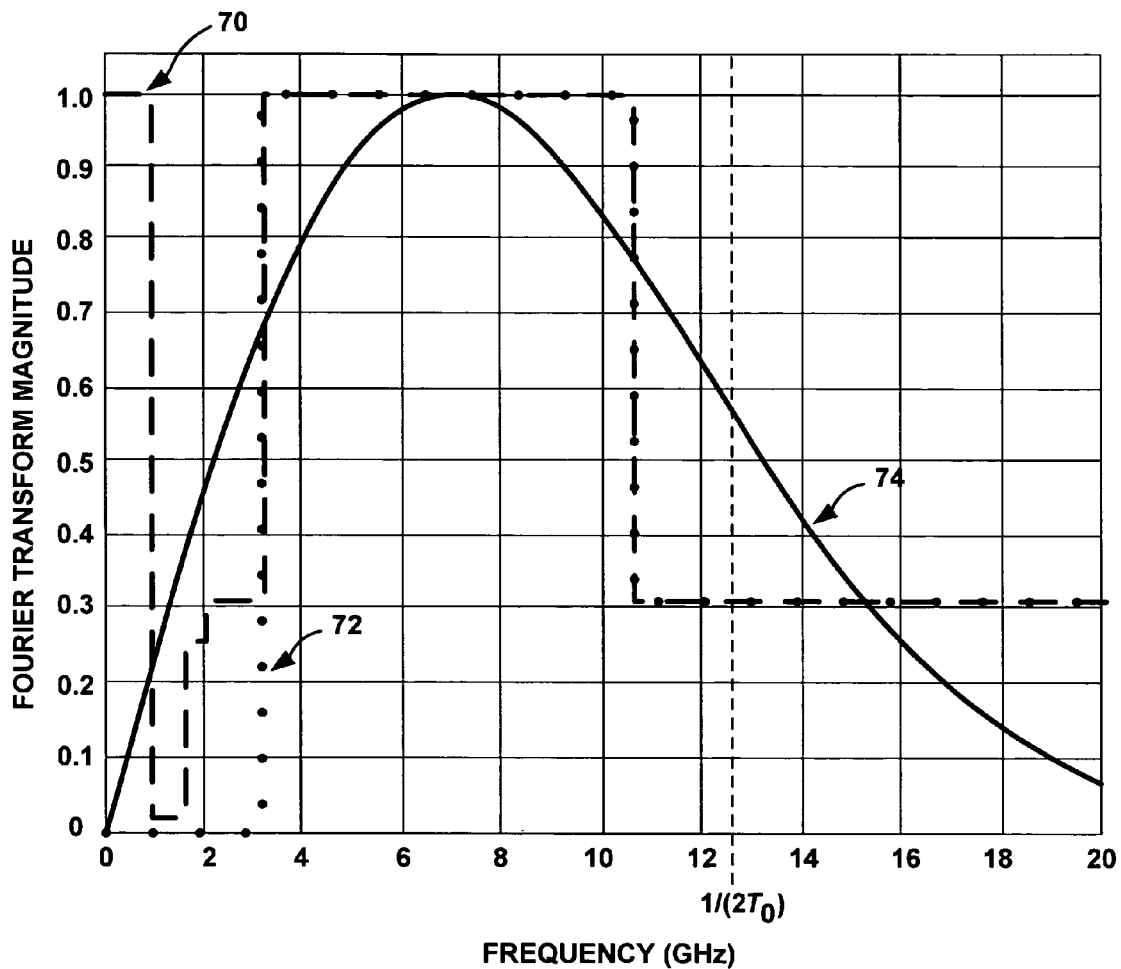
FIG. 8 is a graph illustrating the Fourier Transform (FT) of the FCC spectral mask in FIG. 7, a FT of a desired magnitude profile that approximates the FT of the FCC spectral mask in FIG. 7 over the interval [3.1, 10.6] GHz, and a FT mask of the Gaussian monocycle having maximum power at 6.85 GHz.

Upon normalizing the square root of the FCC spectral mask to a FT mask M(f), with max {M(f)}=1 as illustrated in FIG. 8, it follows that $P_d(f)$ is upper bounded by M(f). The design of pulse shaper 19 and, thus p(t), can be based on equation (13) where w[n] is a set of tap coefficients with spacing $T_0$.

$$p(t) = \sum_{n=0}^{N-1} w[n]g(t - nT_0) \quad (13)$$

Selecting $T_0$ affects w[n] and, thus the complexity and spectral characteristics of the output of transmitter 4A. It can be verified that the FT of p(t) is given according to equation (14) where $$\text{where } W(e^{j2\pi fT_0}) := \sum_{n=0}^{M-1} w[n]e^{-j2\pi fT_0 n}, \quad (14)$$

which is periodic with period $(1/T_0)$ Hz.

$$P(f) = W(e^{j2\pi fT_0})G(f) \quad (14)$$

Furthermore, with $\{w[n]\}_{n=1}^{M-1}$ being real, $|W(e^{j2\pi fT_0})|$ is symmetric with respect to f=0. Consequently, |P(f)| can be designed only over the frequency band $[0, \frac{1}{2}T_0]$. In other words, $T_0$ can be selected according to the prescribed band of interest.

After selecting $T_0$, p(t) is designed by selecting a set of M tap coefficients w[0], . . . , w[M−1] such that the function $|W(e^{j2\pi fT_0})|$ satisfies piecewise function (15).

$$W(e^{j2\pi fT_0})| : \begin{cases} \approx \dfrac{P_d(f)}{|G(f)|}, & f \in \left[0, \dfrac{1}{2T_0}\right] \\ < \dfrac{M(f)}{|G(f)|}, & f \in \left[\dfrac{1}{2T_0}, +\infty\right] \end{cases} \quad (15)$$

Furthermore, if $f_g$ is also specified, the design of pulse shaper 19 is reduced to designing a Finite Impulse Response (FIR) filter. In other words, pulse shaper 19 is designed with a set of M tap coefficients so that the Discrete Time Fourier Transform (DTFT) magnitude $W|(e^{j2\pi F})|$ of p(t) approximates the function $D(F/T_0)$, $F \in [0, 0.5]$ where $$D(f) := P_d(f)/|G(f)|, f \in \left[0, \dfrac{1}{2T_0}\right].$$

Among various FIR filter design methods, the Inverse Fast Fourier Transform (IFFT) is the least complex to implement. However, the IFFT does not offer flexibility in approximating $D(F/T_0)$. Furthermore, aiming at low complexity implementation requires the number of tap coefficients M to be minimized. Consequently, the time duration of pulse shaper 19 is minimized for a given $T_0$ since $T_p = T_g + (M-1)$. Low complexity implementation and flexibility in approximating $D(F/T_0)$ provides motivation to design pulse shaper 19, in some embodiments, according to the Parks-McClellan algorithm. The Parks-McClellan algorithm results in pulse shapers that minimize the maximum approximation error over the frequency band of interest. For simplicity, the design described herein utilizes linear phase filter approximates with symmetric tap coefficients, i.e. w[n]=w[2L−n] for n=0, . . . 2L. Consequently, it is sufficient to design L+1 tap coefficients $\{w[n]\}_{n=0}^{L}$ rather than M=2L+1 tap coefficients because upon defining $w_0[n]=w[n+L]$, $$W_0(e^{j2\pi F}) = \sum_{n=-L}^{L} w_0[n]e^{-j2\pi Fn} = w_0[0] + \sum_{n=1}^{L} 2w_0[n]\cos(2\pi Fn)$$

and $|W_0(e^{j2\pi F})|=|W(e^{j2\pi F})|$. In other words, $W(e^{j2\pi fT_0})|$ is symmetric with respect to $f=0$.

Therefore, the design of pulse shaper 19 is equivalent to selecting tap coefficients $\{w[n]\}_{n=0}^{L}$ according to equation (16) where $\zeta$ represents the union of prescribed disjoint intervals in [0, 0.5] so that $D[F/T_0]$ is continuous in each interval, $$e(F) := \lambda(F)[D\left(\frac{F}{T_0}\right) - W_0(e^{j2\pi F})]$$

is the error function, and $\lambda(F)$ denotes a positive weight function.

$$\min_{\{w_0[n]\}_{n=0}^{L}} \left\{\max_{F \in \zeta} |e(F)|\right\}, \quad (16)$$

The process of selecting the set of tap coefficients can be viewed as a Chebyshev approximation problem with desired function $D(F/T_0)$ and can be solved numerically based on the "Alternation Theorem" in polynomial approximation theory described in T. W. Parks and J. H. Clellan, "Chebyshev Approximation for Nonrecursive Digital Filters with Linear Phase," IEEE Transactions on Circuit Theory, Vol. CT-19, No. 2, March 1972, pp. 189-194, which is incorporated herein by reference.

In order to utilize the entire bandwidth from 3.1-10.6 GHz, the desired magnitude profile $P_d(f)$ must closely approximate the FCC spectral mask as illustrated in FIG. 8 where $P_d(f)=0$, $\forall$ $f<3.1$ GHz to avoid interference to Global Positioning Systems (GPS). Recall also that the tap spacing $T_0$ is selected with respect to the frequency region over which the pulse shaper transmits. Consequently pulse shaper design is significantly different for full band control UWB communications and multi-band UWB communications.

In order to gain full control over the entire frequency band [3.1, 10.6] GHz, $T_0$ is selected so that $1/(2T_0)>10.6$ GHz. The DTFT $W(e^{j2\pi fT_0})$ then satisfies piecewise equation (17) where $M(f)$ is the FT mask, and $P_d(f)$ closely approximates $M(f)$ as illustrated in FIG. 8.

$$|W(e^{j2\pi fT_0})| : \begin{cases} \approx D(f) = \frac{P_d(f)}{|G(f)|} & f \in \left[0, \frac{1}{2T_0}\right] \\ < \frac{M(f)}{|G(f)|} & \text{otherwise,} \end{cases} \quad (17)$$

The spacing of the tap coefficients $T_0$ is selected to satisfy equation (18) because of the periodicity of $W_0(e^{j2\pi FT_0})$. At the same time, it is desirable to select $T_0$ to be as large as possible in order to lower the complexity of implementation.

$$|G(f)||W(e^{j2\pi fT_0})|_{f=\frac{1}{T_0}-10.6} \frac{\left|G\left(\frac{1}{T_0}-10.6\right)\right|}{|G(10.6)|} < M\left(\frac{1}{T_0}-10.6\right) \quad (18)$$

Selecting $T_0$ depends on the Gaussian monocycle parameter $f_g$. For example, when $f_g=6.85$ GHz, $T_0$ is required to be 35.7 pico seconds (ps). With $T_0$ specified, $D(F/T_0)$ is continuous within three intervals: $I_1=(0, 3.1T_0)$, $I_2=(3.1T_0, 10.6T_0)$, and $I_3=(10.6T_0, 0.5)$. The set of $\zeta$ in equation (16) is selected to be $\zeta=\zeta_1\cup\zeta_2\cup\zeta_3$, where $\zeta_1 \subset I_1$, $\zeta_2 \subset I_2$, and $\zeta_3 \subset I_3$. With an approximately selected weight function $\lambda(F)$ given in equation (16), the set of tap coefficients can be selected and pulse shaper 19 can be subsequently designed via equation (13).

In the previous analysis, it was shown that with $f_g=6.85$ GHz, a clock period of $T_0=35.7$ ps is required to design a pulse shaper with maximum power and bandwidth in the FCC spectral mask for a single-band UWB system. Because the selected frequency band covers the entire bandwidth of 0-10.6 GHz, pulse shapers can be designed to approximate the FCC spectral mask over the entire bandwidth. However, the required short clock period may result in high cost and/or high complexity implementation. Alternative pulse shaper designs with larger $T_0$, and thus smaller clock periods, are possible for single-band UWB and result in lower cost and/or lower complexity implementations.

With $f_g=6.85$ GHz the pulse shaper design can take advantage of the symmetry of $D(f)$ in equation (17) and control $P(f)$ only over the lower half of the entire band, i.e. over the interval [0, 6.85] GHz, by doubling the $T_0$. Specifically, selecting $1/(2T_0)=6.85$ GHz corresponds to $T_0=73$ ps. It is important to note that selecting $T_0$, as such, does not guarantee that the FCC spectral mask is well approximated over the entire UWB bandwidth unless $D(f)$ is perfectly symmetric with respect to $f=6.85$ GHz.

In order to approximate the normalized FT mask $M(f)$, the desired function $D_{sym}(f)$ is selected according to piecewise function (19) where $D(f)$ is the desired function in equation (17) and $D_{sym}(F/T_0)$ is continuous in the intervals $I_1=[0, 3.1 T_0]$, and $I_2=[3.1T_0, 0.5]$. The set $\zeta$ in equation (16) is then selected to be $\zeta=\zeta_1\cup\zeta_2$, where $\zeta_1 \subset I_1$, and $\zeta_2 \subset I_2$. With the weight function $\lambda(f)$ being appropriately selected, the pulse shaper can be readily designed.

$$D_{sym}(f) = \begin{cases} 0, & f \in [0, 3.1] \\ \min\{D(f), D(13.7-f)\} & f \in [3.1, 6.85] \end{cases} \quad (19)$$

As mentioned previously, partitioning the UWB bandwidth into sub-bands facilitates FH, which is important for enhancing user capacity and improving the LPI/LPD. On the other hand, it is desirable to avoid adjacent channel interference in multi-band UWB systems by confining the spectrum of each channel within its prescribed band while utilizing the FCC spectral mask in a power efficient manner.

The tap coefficient spacing $T_0$ and thus the clock period can be selected, for example, depending on whether full-band (3.1-106 GHz) or half-band (3.1-10.6 GHZ) control is required. With full-band control, the desired functions $\{D_i(f)\}_{i=0}^{N-1}$, each corresponding to one of the total N sub-bands, are given according to equation (20) where $P_d(f)$ represents the desired magnitude profile. Based on equation (20), pulse shapers can be designed for multi-band UWB systems by appropriately selecting $\lambda(f)$ and $\zeta$.

$$D_i(f) = \begin{cases} 0 & f \in \left[0, 3.1 + i \cdot \frac{7.5}{N}\right] \text{ GHz} \\ \frac{P_d(f)}{|G(f)|} & f \in \left[3.1 + i \cdot \frac{7.5}{N}, 3.1 + (i+1) \cdot \frac{7.5}{N}\right] \text{ GHz}, \\ 0 & f \in \left[3.1 + (i+1) \cdot \frac{7.5}{N}, f_{min}\right] \end{cases} \quad (20)$$

It is important to note that with the same number of sub-bands N, full-band control results in N FH slots, whereas half-band control only results in N/12 FH slots. Clearly, on top of this performance-complexity tradeoff, there is also a user capacity-complexity tradeoff. Furthermore, it is important to note that although the pulse shaping techniques described herein are described using the Gaussian monocycle, any analog pulse shape can be used in accordance with equation (13). This is because objective functions D(f) are normalized with respect to the FT of the analog pulse shaper, e.g. G(f) for the Gaussian monocycle. Furthermore, it can be desirable to use only a fraction of the entire bandwidth in order to avoid NBI or, the highly lossy high-frequency bands. In such cases, parameters $T_0$ and $\{w[n]\}_{n=1}^{M-1}$ can be flexibly selected to meet desirable spectral characteristics.

In addition to substantially maximizing power and bandwidth in the FCC spectral mask, UWB communication system 2 may dynamically avoid NBI to, and from, co-existing narrow-band services, e.g. WLANs employing the 802.11a standard. UWB transmissions are low power and appear as minimal noise to non-UWB systems operating within licensed FCC frequencies. However, it may be desirable to avoid selected frequency bands in order to increase performance of system 2. For example, system 2 may include a number of pre-programmed sets of tap coefficients with each set of tap coefficients selected to avoid known NBI. System 2 may adaptively search the available UWB bandwidth for co-existing services and subsequently select the appropriate set of coefficients to avoid NBI from any detected co-existing services. In this manner, system 2 can dynamically avoid NBI from co-existing narrow-band services.

In order to minimize interference from co-existing services, pulse shaper 19 may be designed to impose minimum energy leakage in a selected frequency band. For example, pulse shaper 18 may be designed to reduce energy in the 5 GHz frequency band in order to avoid NBI to and from WLANs employing the 802.11a standard. Consequently, interference from a co-existing narrow-band system to system 2 can be minimized, and vice versa. NBI frequency bands may be identified by the FCC spectral mask or may correspond to any band that has substantial interference. Thus, the NBI frequency bands where power is reduced by the digital filter may be totally different for different scenarios, settings or times.

The following analysis quantifies the effect pulse shaper 19 has on the performance, i.e. bit error rate (BER). Proposition 1 gives a measure for the average BER of single-user UWB communication system 2 utilizing PPM and TH as described in equation (1) where channel 6 is an additive white Gaussian Noise (AWGN) channel with NBI 7 and receiver 8 is a correlation receiver.

Proposition 1 In a single-user UWB link over an AWGN channel with NBI, with binary PPM and TH as given according to equation (1), the average BER with a correlation receiver is given according to equation (21) where $N_0/2$ represents AWGN, $J_0/2$ represents the PSD of NBI 7 over the frequency band $[f_L, f_U]$, and $\alpha$ is given according to equation (22) where H(f) is given according to equation (24) and represents the FT of channel 6 where channel 6 is given according to equation (23)

$$P_e = Q\left(\sqrt{\frac{N_f \varepsilon}{N_0\left(1 + \alpha \frac{J_0}{N_0}\right)}}\right) \quad (21)$$

$$\alpha := \int_{f_L}^{f_U} |H(f)|^2 df / N_f \quad (22)$$

$$h(t) := p_s(-t) - p_s(-t - \Delta) \quad (24)$$

$$h(f) = (1 - e^{j2\pi f \Delta})\left[\sum_{k=0}^{N_f - 1} e^{j2\pi k f T_f} e^{j2\pi c_k f T_c}\right] \frac{P*(f)}{\sqrt{\varepsilon_p}} \quad (25)$$

The received signal over one symbol interval $[nT_s, (n+1)T_s]$ is given according to equation (25) where n(t) represents the AWGN with variance $N_0/2$ and i(t) represents the NBI with PSD given according to equation (26) where $f_L$ and $f_U$ represent the lower and upper bounds of the spectral support of the received signal, respectively.

$$r(t) = \sqrt{\varepsilon} p_s(nT_s - s(n)\Delta) + n(t) + i(t) \quad (25)$$

$$\Phi_{ii}(f) = \begin{cases} \frac{J_0}{2}, & |f| \in [f_L, f_U] \\ 0, & \text{otherwise} \end{cases} \quad (26)$$

A correlation receiver uses the template given according to equation (27) for a received signal utilizing PPM. The decision statistic for the $n^{th}$ transmitted information symbol is given according to equation (28) when selecting $\Delta \geq T_p$, where $v_n$ is given according to equation (29) and $\eta_n$ is given according to equation (30).

$$u(t) = p_s(t - nT_s) - p_s(t - nT_s - \Delta) \quad (27)$$

$$r_n = \int_{nT_s}^{(n+1)T_s} r(t)v(t)dt = \begin{cases} N_f\sqrt{\varepsilon} + v_n + \eta_n, & \text{if } s(n) = 0 \\ -N_f\sqrt{\varepsilon} + v_n + \eta_n, & \text{if } s(n) = 1 \end{cases} \quad (28)$$

$$v_n := \int_{nT_s}^{(n+1)T_s} n(t)v(t)dt \quad (29)$$

$$\eta_n := \int_{nT_s}^{(n+1)T_s} i(t)v(t)dt \quad (30)$$

It can be verified that $v_n$ is a zero mean Gaussian with variance $N_f N_0$. Modeling i(t) as a Gaussian random process, $\eta_n$ is also Gaussian. In order to derive an expression for the variance of $\eta(t)$, consider equation (31) as the output of a linear time-invariant (LTI) system with impulse response given according to equation (32) and input i(t). Thus, it follows that $\eta(t)$ is Gaussian with PSD given according to equation (33) where H(f) is given according to equation (24). With tin given according to equation (34) it follows that the variance of $\eta_n$ is given according to equation (35). Further, defining $\alpha$ according to equation (36) and noticing that $$\int_0^{+\infty} |H(f)|^2\, df = N_f$$

the variance of $\eta_n$ simplifies to equation (37). As a result, the average BER is given according to equation (21).

$$\eta(t) = \int_{-\infty}^{+\infty} i(\tau)(p_s(\tau-t) - p_s(\tau-t-\Delta))\tau) \quad (31)$$

$$h(t) = p_s(-t) - p_s(-t\Delta) \quad (32)$$

$$\Phi_{\eta\eta}(f) = |H(f)|^2 \Phi_{ii}(f) \quad (33)$$

$$\eta_n := \eta(t)|_{t=nT_s} \quad (34)$$

$$\mathrm{var}(\eta_n) = J_0 \int_{f_L}^{f_U} |H(f)|^2 df \quad (35)$$

$$\alpha := \int_{f_L}^{f_U} |H(f)|^2 df / \int_0^{+\infty} |H(f)|^2 df \quad (36)$$

$$\mathrm{var}(\eta_n) = \alpha N_f J_0 \quad (37)$$

From proposition 1, it is clear that the parameter α affects the BER performance by altering the effective SNR and α is determined by the pulse shaper p(t). The shape of pulse p(t) can be designed with minimum energy within the selected frequency band [$f_L, f_U$] by using the techniques described herein. Consequently, the BER of system can be reduced. The desired PSD $P_d(f)$ has been set equal to zero over the frequency band [0, 3.1] GHz in the previous analysis to minimize the value of α so as to mitigate the NBI from GPS within this frequency band.

Figure 16:
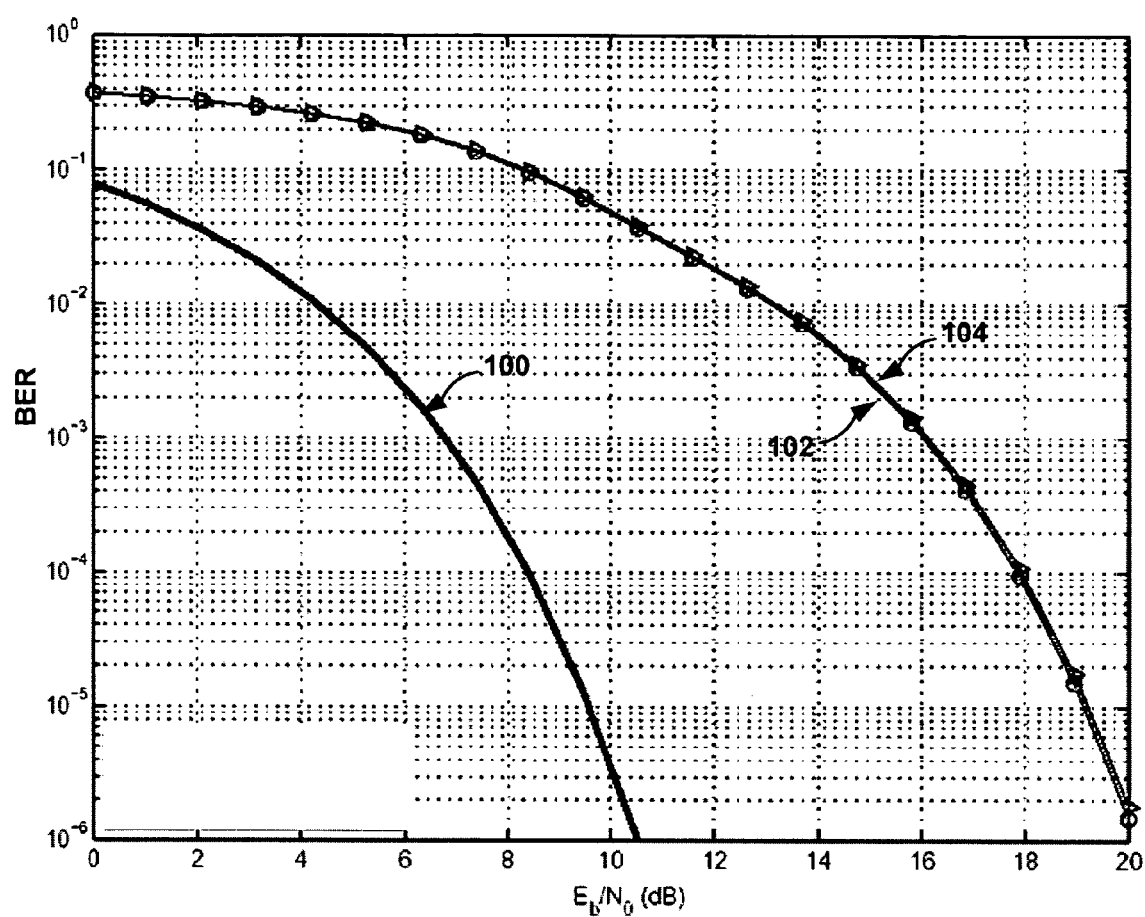
FIG. 16 is a graph illustrating bit error rate (BER) performance of the transmitter in FIG. 2 for different pulses in the absence of narrow-band interference (NBI).

In the presence of multipath effects, NBI can also be mitigated by designing pulse shapers with small a values. This is possible because even in the presence of multipath, the variance of $\eta_n$ is reduced in the same way as for AWGN channels as will be verified by simulations illustrated in FIG. 16 comparing the BER performance in the presence of NBI.

Moreover, the described techniques based on equation (13) can be implemented using currently available hardware. For example, transmitter 4A includes digital filter 14 and pulse generator 16. In some embodiments, digital filter 14 comprises a shift register that stores the set of tap coefficients $\{w[n]\}_{n=1}^{M-1}$ and pulse generator 16 comprises a Gaussian monocycle generator.

Figure 3:
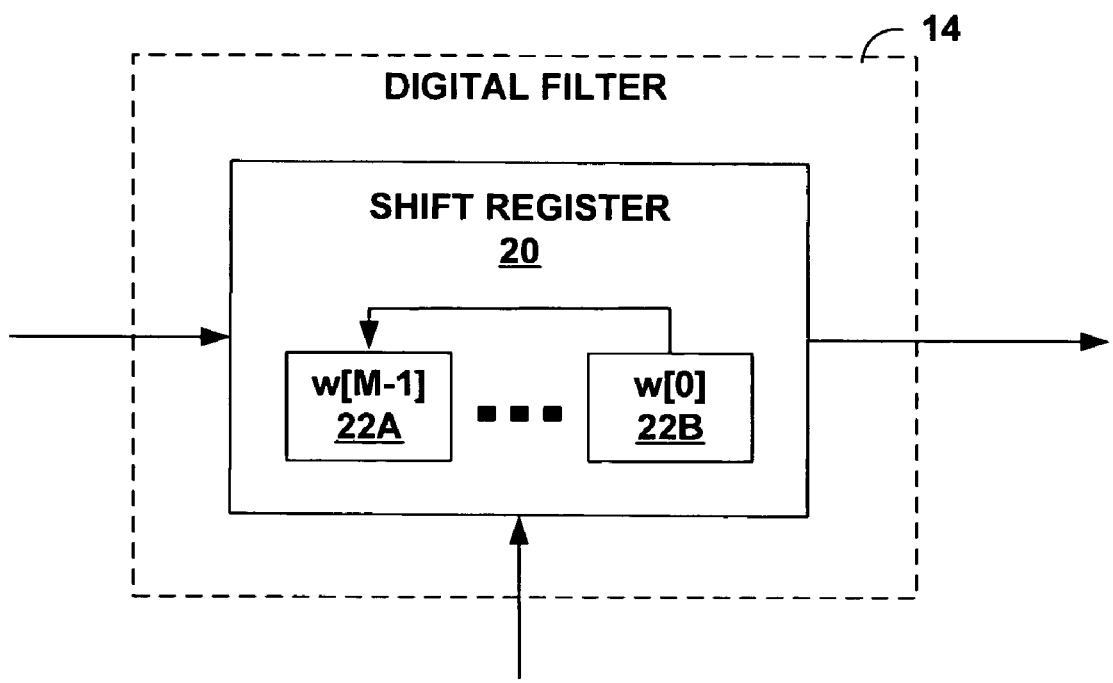
FIG. 3 is a block diagram illustrating an example embodiment of a digital filter within the transmitter of FIG. 2.

FIG. 3 is a block diagram illustrating an example embodiment of digital filter 14 within transmitter 4A of FIG. 2. Digital filter 14 includes shift register 20 that stores a set of selected tap coefficients 22A-22N (which are collectively referred to herein as tap coefficients 22). For example, shift register 20 may store tap coefficients 22 which are selected according to the techniques described herein. In general, shift register 20 stores tap coefficients $\{w[n]\}_{n=1}^{M-1}$ selected according to equation (16).

Shift register 20 receives a stream of information bearing symbols from pulse generator 10 and generates a digitally filtered stream of information bearing symbols that substantially maximize power and bandwidth in the FCC spectral mask. In some embodiments, shift register 20 may store a plurality of sets of tap coefficients. In alternative embodiments, shift register 20 may receive any one of a plurality of sets of coefficients from a memory or processor. In any case, each set of tap coefficients may be designed to avoid known NBI. In some cases, UWB system 2 (FIG. 1) may adaptively search the available UWB for co-existing services and subsequently select the appropriate set of coefficients to avoid NBI from the detected co-existing narrow-band services. In this manner, UWB system 2 can dynamically avoid NBI from co-existing narrow-band services.

Figure 4:
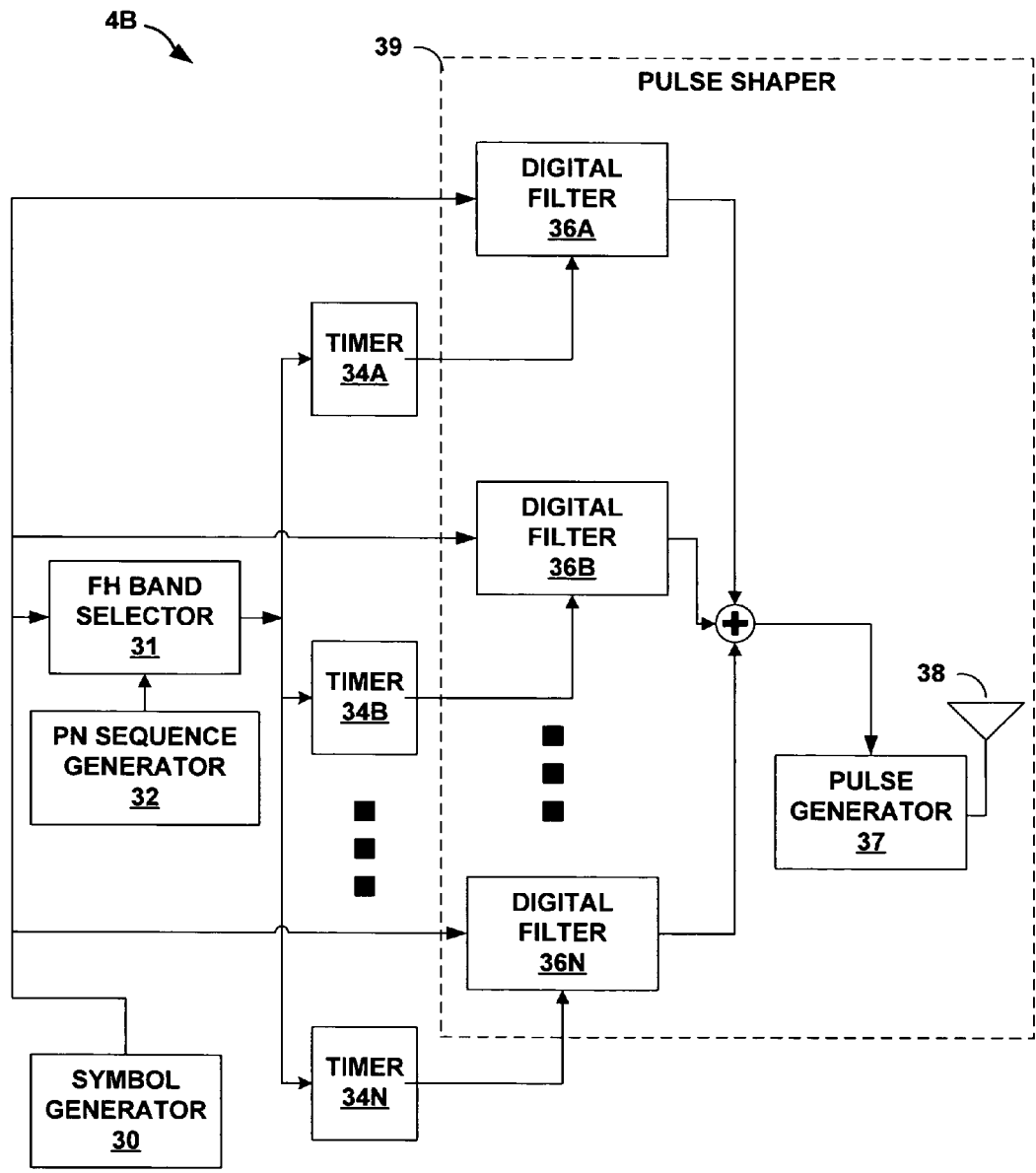
FIG. 4 is a block diagram illustrating an alternative embodiment of the transmitter within the UWB wireless communication system of FIG. 1.

FIG. 4 is a block diagram illustrating an alternative embodiment of transmitter 4 in FIG. 1, referred to as transmitter 4B. Transmitter 4B generates digitally filtered UWB pulses to substantially maximize power and bandwidth in the FCC spectral mask for a single user in multi-band UWB communications. Partitioning the UWB into sub-bands facilitates FH, which is important for enhancing user capacity and improving LPI/LPD. It is desirable to avoid adjacent channel interference in multi-band UWB systems by confining the spectrum of each channel within its prescribed band while utilizing the FCC spectral mask in a power and bandwidth efficient manner.

In the illustrated embodiment of FIG. 4, transmitter 4B comprises a symbol generator 20 that generates a stream of information bearing symbols, a FH band selector 21, a pseudo number sequence generator 22, a set of timers 24A-24N (which are collectively referred to as timers 24), a set of shift registers 26A-26N (which are collectively referred to as shift registers 26) that correspond to timers 24, a pulse generator 27, and a transmit antenna 28. FH band selector 21 selects a band from the multi-band UWB spectrum according to pseudo random sequence generated by pseudo number (PN) sequence generator 22. Timers 24 process the stream of information bearing symbols according to a PPM scheme and corresponding digital filters 26 digitally filter the stream of information bearing symbols to substantially maximize power and bandwidth in the selected frequency band, e.g. a sub-band of the FCC spectral mask. In some embodiments, shift registers 26 may comprise a set, i.e. bank, of shift registers. The bank of shift registers may be used by switching among the band of shift registers to select the desired frequency band. Alternatively, the memory of digital filters 26 can be reset to hop from one frequency band to another. Pulse generator 27 generates digitally filtered UWB pulses based on the PPM digitally filtered stream of information bearing symbols. Pulse generator 27 may be an analog pulse generator that generates a Gaussian pulse although the invention is not limited in this respect. In general, pulse generator 27 may be an analog pulse generator that generates any analog pulse shape. An overall pulse shaping effect (herein, "pulse shaping") may be represented as the aggregate effect of digital filters 26, pulse generator 27, and antenna 28. Consequently, pulse shaper 29 includes digital filter 26, pulse generator 27, and transmit antenna 28.

Figure 15:
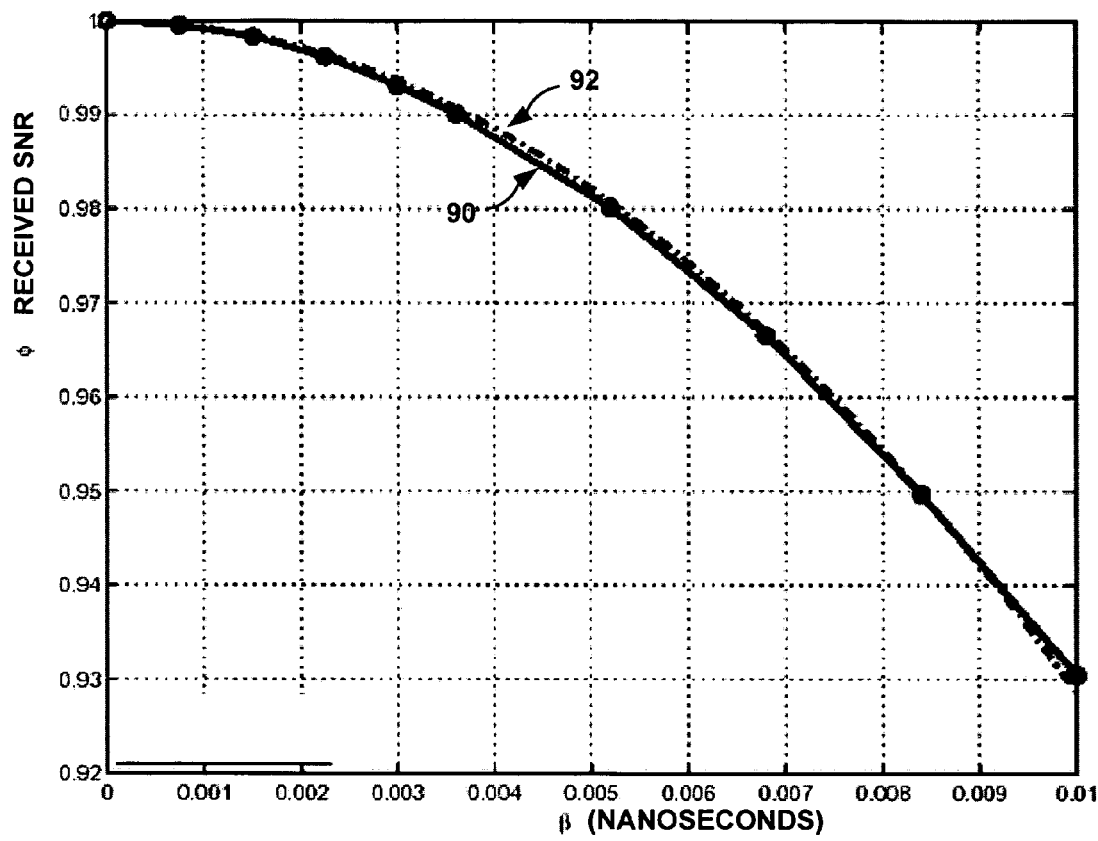
FIG. 15 is a graph illustrating the received signal-to-noise ratio (SNR) for the transmitter in FIG. 2 with varying clock jitter.

Importantly, the digital architecture of transmitter 4B implements linear combinations of the baseband Gaussian monocycle and does not involve analog carriers. Accordingly, CFO effects commonly encountered with analog FH implementations are avoided. Such a digital implementation of a FH transmitter for UWB communications can require high timing accuracy. For example, clock timing accuracy may be on the order of several pico seconds (ps). Timers 24 may maintain pico second accuracy. Timers 24 may, in some embodiments, comprise application specific integrated circuits (ASIC) timer modules commercially available from Time Domain Corporation of Huntsville, Ala. that include PulsON technology and can provide the pico second accuracy. As a result of the digital implementation described herein, the set of tap coefficients $\{w[n]\}_{n=1}^{M-1}$ can be adjusted to maximize power and bandwidth in the FCC spectral mask even when timer 12 is imperfect. The effect of clock jitter on the BER performance of UWB system 2 is illustrated in FIG. 15.

Figure 5:
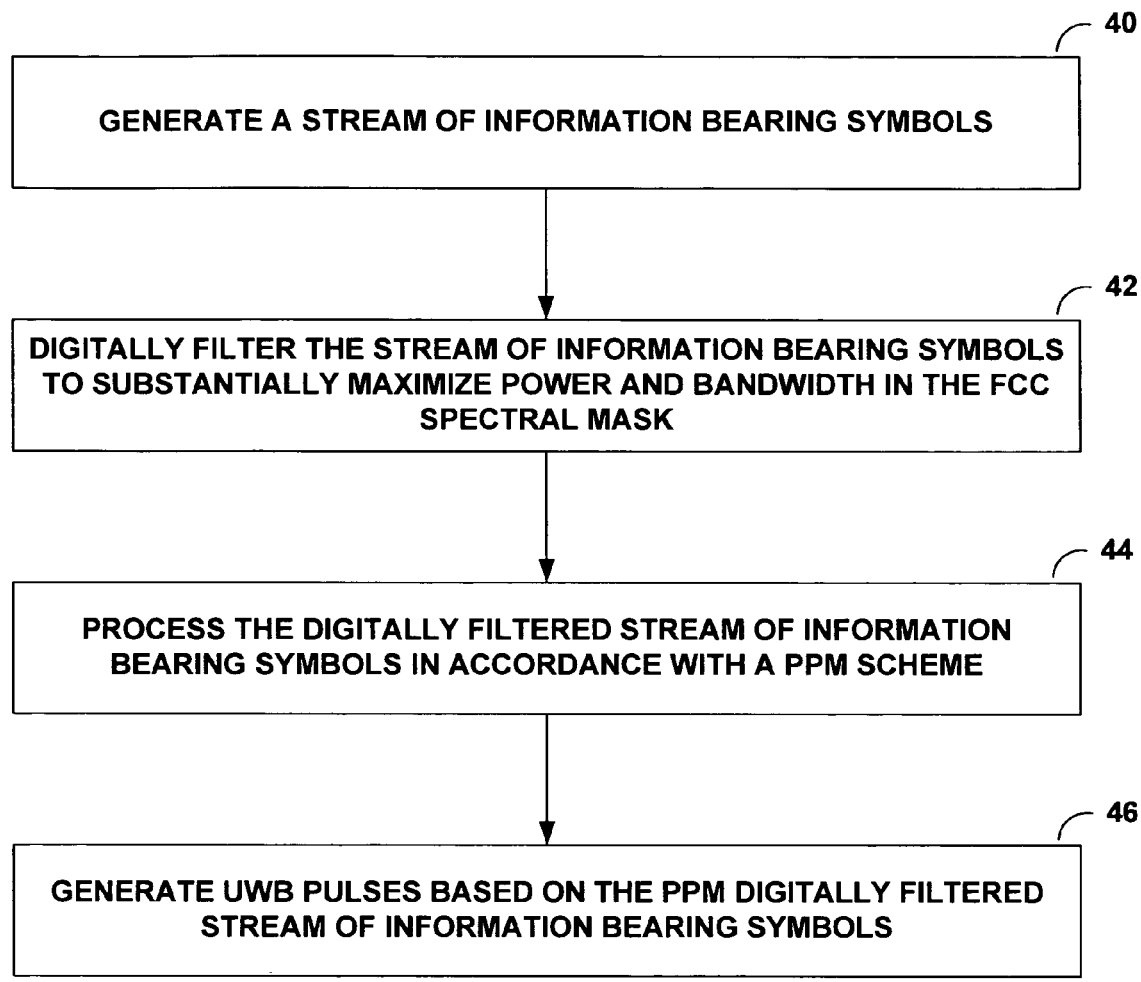
FIG. 5 is a flowchart illustrating an example mode of operation of the transmitter of FIG. 2.

FIG. 5 is a flowchart illustrating an example mode of operation of transmitter 4A of UWB communication system 2 in FIG. 2. In general, symbol generator 10 generates a stream of information bearing symbols (40). Digital filter 14 digitally filters the stream of information bearing symbols to substantially maximize power and bandwidth in the FCC spectral mask (42) and timer 12 processes the stream of information bearing symbols in accordance with a PPM scheme (44). Digitally filtering the stream of information bearing symbols comprises applying the set of tap coefficients selected according to equation (16) as described herein. In some embodiments, the set of tap coefficients are selected to avoid NBI from co-existing narrow-band services as well as substantially maximize power and bandwidth in the FCC spectral mask. Pulse generator 16 subsequently generates digitally filtered UWB pulses based on the PPM digitally filtered stream of information bearing symbols (46). As a result, transmitter 4A generates digitally filtered UWB pulses that substantially maximize power and bandwidth in the FCC spectral mask, yet avoid generating signals that violate the FCC mask.

The pulse shaping techniques described herein may be applied to single-band and multi-band UWB communications. In single-band operation, transmitter 4A may transmit over the full UWB bandwidth or a selected frequency band of the full UWB bandwidth. For example, pulse shaper 19 may be designed to closely approximate the FCC spectral mask over the full UWB bandwidth or may be designed to transmit over the lower half of the UWB bandwidth in order to reduce complexity and/or cost of implementation. In any event, transmitter 4A can be implemented without modifying the analog components of existing UWB transmitters. Furthermore, in multi-band UWB communications, transmitter 4A can facilitate FH which is important for enhancing user capacity and robustifying LPI/LPD.

Figure 6:
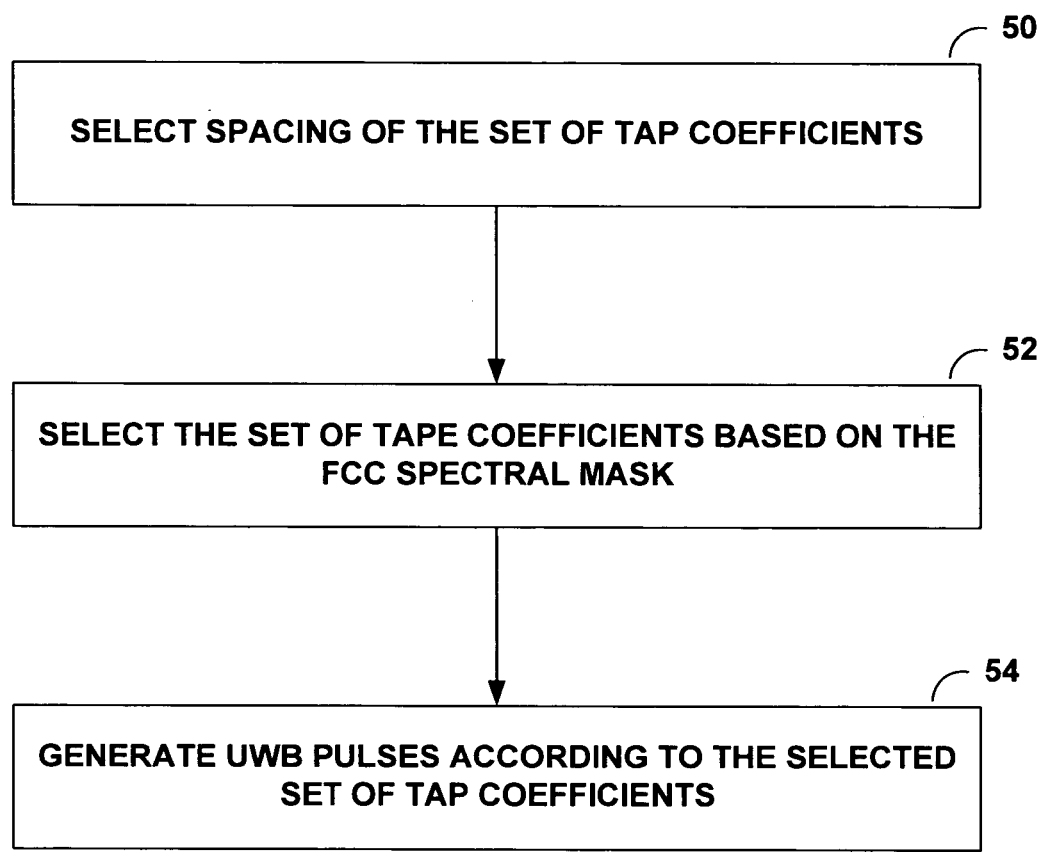
FIG. 6 is a flowchart illustrating a technique for defining the operation of the pulse shaper within the transmitter of FIG. 2.

FIG. 6 is a flowchart illustrating a technique for defining the operation of a pulse shaper 19 within the transmitter of FIG. 2 and then generating pulses according to the defined operation. Generally, pulse shaper 19 generates UWB pulses that maximize power and bandwidth in the FCC spectral mask. In particular, digital filter 14 digitally filters a stream of information bearing symbols generated by symbol generator 10 to substantially maximize power and bandwidth in the FCC spectral mask. Digitally filtering the stream of information bearing symbols comprises applying digital filter tap weights, which may be defined as described herein. Defining the filter to operate properly may include selecting the spacing $T_0$ of a set of tap coefficients (50), selecting the set of tap coefficients to maximize power and bandwidth in the FCC spectral mask (52). Pulse shaper 19 can then generate UWB pulses according to the selected set of tap coefficients (54). Pulse generator 16 generates an analog UWB pulse based on the digitally filtered stream of information bearing symbols. Pulse generator 16 may generate any pulse shape and is not limited to generating the Gaussian pulse. As a result, pulse shaper 19 generates UWB pulses that maximize power and bandwidth in the FCC spectral mask.

The spacing of the tap coefficients affects the performance and complexity of transmitter 4A. Consequently, low complexity implementations minimize the number of tap coefficients M, which in turn minimizes the duration of pulse shaper 19. Furthermore, the spacing of the tap coefficients depends on the frequency band of interest and may be selected according to the previously described techniques. For example, for a given number of tap coefficients M, $T_0$ may be selected based on whether transmitter 4A is operating over the full UWB bandwidth or the lower half of the UWB bandwidth.

As described previously, selecting the set of tap coefficients comprises designing an M-tap FIR filter with coefficients $\{w[n]\}_{n=1}^{M-1}$ so that the DTFT of the FIR filter has magnitude that approximates the function $D(F/T_0)$, $F \in [0, 0.5]$ where $D(f):=P_d(f)/|G(f)|, f \in [0, \tfrac{1}{2}T_0]$. In some embodiments, the set of tap coefficients is selected utilizing the Parks-McClellan algorithm which selects tap coefficients that minimize the maximum approximation error over the frequency band of interest, i.e. the FCC spectral mask or a selected frequency band of the FCC spectral mask. As described previously, linear phase filter approximates with symmetric taps may be selected for reduced design complexity. Consequently, instead of M=2L+1 tap coefficients, it is sufficient to design L+1 tap coefficients according to equation (16). Importantly, $T_0$ and $\{w[n]\}_{n=1}^{M-1}$ can be flexibly selected to meet desirable spectral specifications. For example, it may be desirable to utilize only a fraction of the full UWB bandwidth in order to avoid NBI or the highly-loss high frequency bands.

FIG. 7 is a graph illustrating the Federal Communications Commission (FCC) spectral mask for indoor UWB communication systems 60 and the EIRP transmit spectrum of a first system with prohibitively high power 62 and a second system with sufficiently low power 64. The first and second system 62, 64 utilize the Gaussian monocycle and are described by substituting equation (8) into equation (1) with appropriate amplitude values, respectively. The first system 62 maximizes the transmission power but violates the FCC spectral mask 60 whereas the second system 64 does not violate the FCC spectral mask 60 but does not exploit the FCC spectral mask 60 in a power efficient manner. Consequently, the Gaussian monocycle does not maximize the power and bandwidth in the FCC spectral mask.

In general, for any pulse shaper p(t), compliance to the FCC spectral mask can be achieved by adjusting the transmit energy per pulse $\in$, or equivalently, the transmit power. For example, the maximum allowable transmit power limited by the FCC spectral mask corresponding to three pulse shapers is given below. The three pulse shapers include the Gaussian monocycle g(t) with $f_g$=6.85 GHz which corresponds to the second system 64, the pulse shaper $p_{16}(t)$ with time duration 1.3 ns which is designed in greater detail in FIGS. 10A, 10B, and the prolate-spheroidal pulse shaper $p_{p-s}(t)$ described in B. Parr et al. "A Novel Ultra-Wideband Pulse Design Algorithm," IEEE Communications Letters, Vol. 7, No. 5, May 2003, pp. 219-221, which is incorporated herein by reference, with pulse duration 1.3 ns.

The FT of g(t), $p_{p-s}(t)$, and $p_{16}(t)$ is denoted G(f), $P_{p-s}(f)$, and $P_{16}(f)$, respectively, and correspond to EIRP spectra $|G(f)|^2/T_f$, $|P_{p-s}(f)|^2/T_f$, and $|P_{16}(f)|^2/T_f$. The maximum allowable power of each of the pulse shapers for transmissions that comply with the FCC spectral mask are given according to equations (38-49) where $\theta_1$, $\theta_2$, and $\theta_3$ are scaling factors. Importantly, the maximum allowable power of g(t) is −66.3 dBm/MHz as illustrated by the second system 64 and −41.3 dBm/MHz is the maximum allowable power in the FCC spectral mask 60.

$$\max_f \frac{|\theta_1 G(f)|^2}{T_f} = -66.3 \text{ dBm/MHz} \tag{38}$$

$$\max_f \frac{|\theta_2 P_{p-s}(f)|^2}{T_f} = -41.3 \text{ dBm/MHz} \tag{39}$$

$$\max_f \frac{|\theta_3 P_{16}(f)|^2}{T_f} = -41.3 \text{ dBm} \tag{40}$$

The maximum power corresponding to each pulse shaper is determined according to equations (41-43), respectively. Consequently, it is clear that the pulse shaper described in FIGS. 10A, 10B herein utilizes the FCC spectral mask 60 most efficiently, i.e. has the highest maximum power while complying with the FCC spectral mask 60. FIG. 10A illustrates a graph of the pulse in the time domain and FIG. 10B illustrates a graph of the pulse in the frequency domain.

$$\rho_g = \frac{|\theta_1|^2 \int |G(f)|^2 df}{T_f} = 0.00387 \text{ mW} \tag{41}$$

$$\rho_{16} = |\theta_2|^2 \int |P_{16}f|^2 df = 0.91 \text{ mW} \tag{42}$$

$$\rho_{p-s} = \frac{|\theta_3|^2 \int |P_z(f)|^2 df}{T_f} = 0.25 \text{ mW} \tag{43}$$

FIG. 8 is a graph illustrating the FT of the FCC spectral mask M(f) 70 for indoor UWB communication systems, the FT of a desired magnitude profile $P_d(f)$ 72 that approximates the FT of the FCC spectral mask 70 over the interval [3.1, 10.6] GHz, and the FT mask of the Gaussian monocycle 74 with $f_g$=6.85 GHz. The desired magnitude profile $P_d(f)$=0, $\notin$ f<3.1 GHz to avoid interference to and from GPS systems. Furthermore, with $f_g$=6.85 GHz, the FT of the desired magnitude profile 72 can be controlled over only the lower half of the UWB bandwidth, i.e. over the interval [0, 6.85] GHz. Therefore, the clock rate can be halved by exploiting symmetry. In other words, the $T_0$ value can be doubled in comparison to the previously specified value for full band control, i.e. $T_0$=35.7 ps. In particular, $1/(2T_0)$=6.85 GHz, which corresponds to $T_0$=73 for full UWB bandwidth as previously specified.

Figure 9:
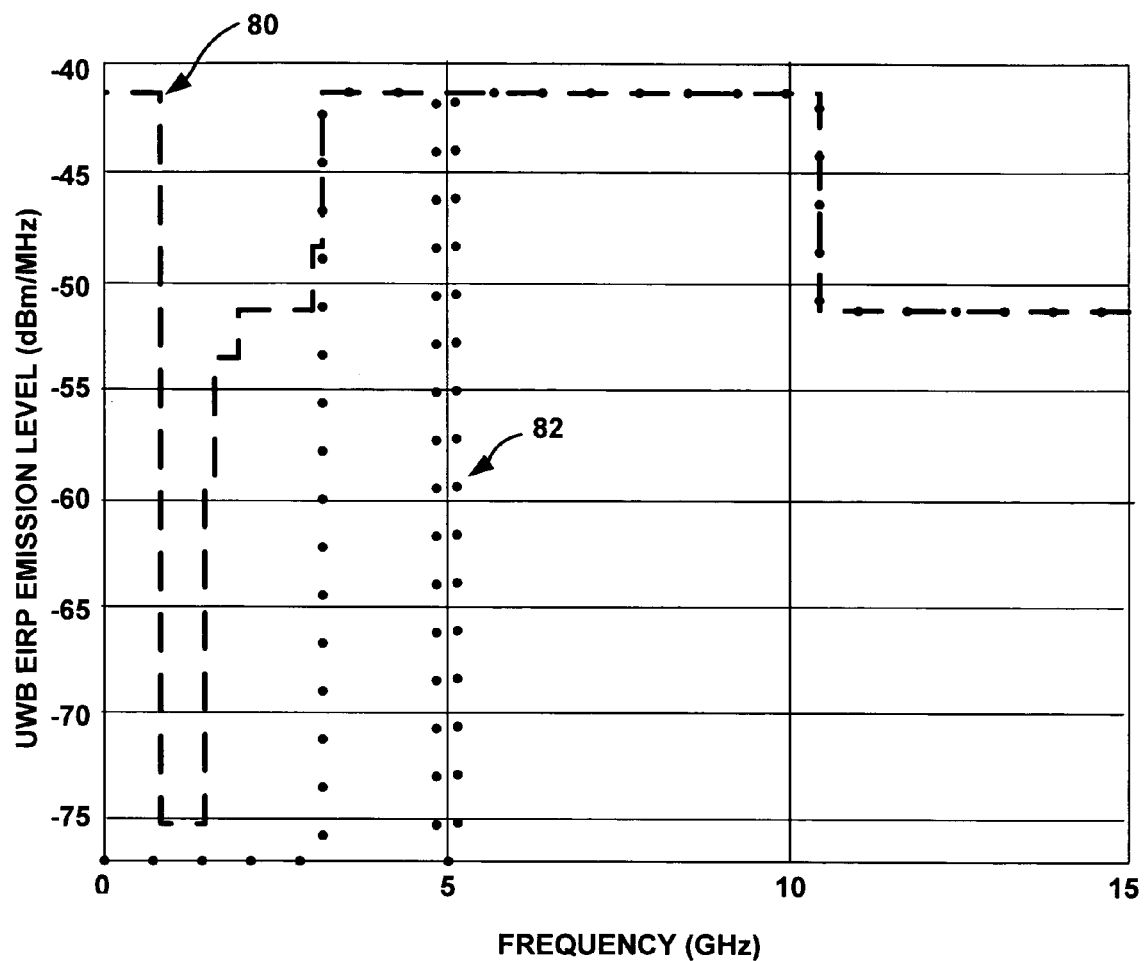
FIG. 9 is a graph illustrating the Fourier Transform of the FCC spectral mask for UWB communication systems in FIG. 7 and a Fourier Transform mask that substantially maximizes the power and bandwidth within the FCC spectral mask while avoiding narrow band interference from a wireless local area network (WLAN).

FIG. 9 is a graph illustrating the Fourier Transform of the FCC spectral mask for indoor UWB communication systems 80 in FIG. 7 and a Fourier Transform mask 82 that substantially maximizes the power and bandwidth within the FCC spectral mask while avoiding NBI from a wireless local area network (WLAN) employing. In particular, FT mask 82 reduces energy in approximately the 5 GHz frequency in order to avoid NBI to and from WLANs employing the 802.11a standard. While UWB transmissions are low power and appear as minimal noise to non-UWB systems operating within licensed FCC frequencies it may be desirable to avoid selected frequency bands in order to increase performance of system 2. For example, wireless UWB communication system 2 may operate in an environment in which a WLAN employing the 802.11a standard also operates. Consequently, it is desirable for UWB communication system 2 to avoid NBI to and from the WLANs. In general, UWB communication system 2 may be designed to reduce energy in a selected frequency in order to avoid NBI from co-existing narrow-band systems.

For example, UWB communication system 2 may include a number of pre-programmed sets of tap coefficients with each set of tap coefficients designed to avoid known NBI. UWB communication system 2 may adaptively search the available UWB bandwidth for co-existing services and subsequently select the appropriate set of coefficients to avoid NBI from any detected co-existing services. In this manner, system 2 can dynamically avoid NBI from co-existing narrow-band services.

FIG. 10A is a graph illustrating an exemplary design of digital filter 14 within transmitter 4A of FIG. 2 for single-band UWB communication with clock rate $T_0$=35.7 ps. In particular, the previously described sets $\xi_1$, $\xi_2$, and $\xi_3$ are selected to be $\xi_1$=[0, 0.1107], $\xi_2$=[0.15, 0.33] and $\xi_3$= [0.3786, 0.5], respectively. The weight function is selected to be $\lambda(F)$=2, when $F \in \xi_1$ and $\lambda(F)$=1 when $F \in \xi_2 \cup \xi_3$. Frequency band $\xi_1$ is selected to have a greater weight because it is desirable to have the approximation error and, thus the energy in $\xi_1$ to be smaller than in frequency bands $\xi_2$, $\xi_3$. The graph illustrated in FIG. 10A was generated with simulations for L=16, i.e. digital filter of length M=33.

FIG. 10B is a graph illustrating the Fourier Transform of the exemplary design of digital filter 14 in FIG. 10A.

FIG. 11A is a graph illustrating an alternative design of the digital filter within transmitter 4A of FIG. 2 for single-band UWB communications with clock rate $T_0$=73 ps. In particular, the previously described sets $\xi_1$, $\xi_2$ are selected to be $\xi_1$=[0, 0.2263] and $\xi_2$=[0.28, 0.5]. The weight function is selected to be $\lambda(F)$=5 in $\xi_1$ and $\lambda(F)$=1 in $\xi_2$. The graph illustrated in FIG. 11A was generated with simulations for L=16 which results in a pulse duration $T_p$=2.52 nanoseconds (ns).

FIG. 11B is a graph illustrating the Fourier Transform of the design of digital filter 14 in FIG. 11A.

Figure 12A:
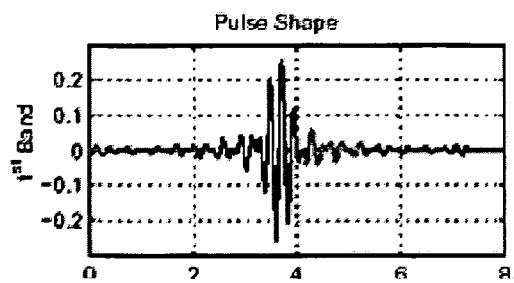
FIGS. 12A, 13A, and 14A are graphs illustrating an exemplary design of multi-band digital filters.
Figure 13A:
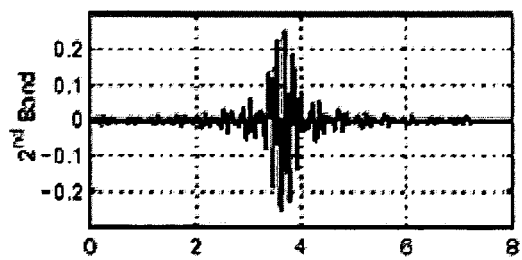
Figure 14A:
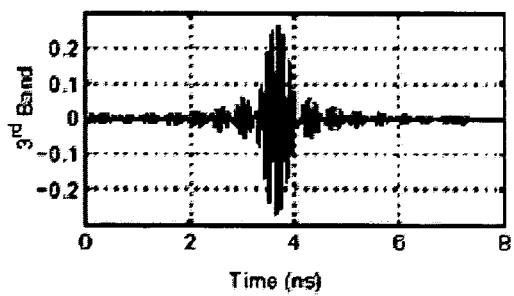

FIGS. 12A, 13A, and 14A are graphs illustrating an exemplary design of digital filter 14 within transmitter 4A of FIG. 2 for multi-band UWB communications with N=3 sub-bands and clock rate $T_0$=35.7 ps. In particular, the desired functions $D_i(f)$ for i=0, 1, 2 are given according to equation (20) where i=0 corresponds to the first sub-band, i=1 corresponds to the second sub-band, and i=2 corresponds to the third sub-band. The set $\zeta$ is selected for equation (16) as the union of $\zeta_1 \cup \zeta_2 \cup \zeta_3$ to be [0, 0.1107]$\cup$[0.1178, 0.1928]$\cup$[0.2, 0.5] for the first sub-band which is illustrated in FIG. 12A, [0, 0.2]$\cup$ [0.2071, 2.2821]$\cup$[0.2892, 0.5] for the second sub-band which is illustrated in FIG. 13A, and [0, 2.2892]$\cup$[0.2964, 0.3714]$\cup$[0.3785, 0.5] for the third sub-band which is illustrated in FIG. 14A. The weight function is selected to be $\lambda(F)$=5 in $\zeta_2$ and $\lambda(F)$=1 in $\zeta_1 \cup \zeta_3$.

Figure 12B:
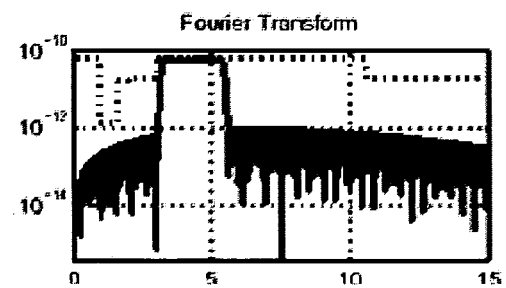
FIGS. 12B, 13B, and 14B are graphs illustrating the Fourier Transform of the design of digital filter for multi-band UWB communications in FIGS. 12A, 13A, and 14A, respectively.
Figure 13B:
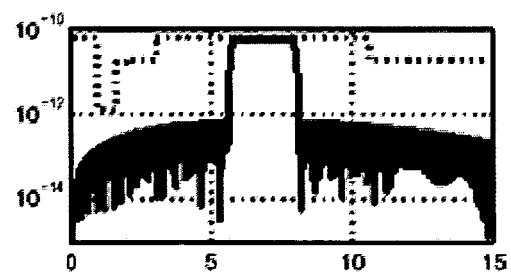
Figure 14B:
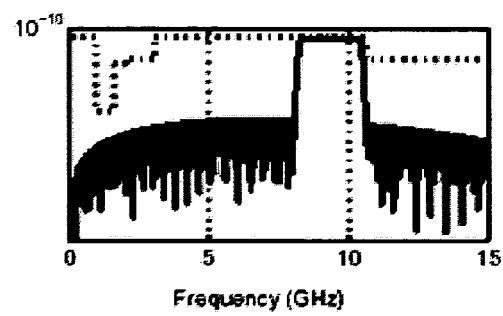

FIGS. 12B, 13B, and 14B are graphs illustrating the Fourier Transform of the design of digital filter 14 for multi-band UWB communications in FIGS. 12A, 13A, and 14A, respectively.

FIG. 15 is a graph illustrating the received SNR for transmitter 4A in FIG. 2 with varying clock jitter. In particular, FIG. 15 illustrates $\phi(\beta)$ for digital filter 14 with design described in FIG. 12A, i.e. digital filter 14 for multi-band UWB communications over the first sub-band, for small variations of $\beta$. FIG. 15 clearly illustrates that the received SNR is robust to small timing jitter effects. As will be shown below in Proposition 2, the simulated SNR $\phi(\beta)$ 90 is well approximated by $1-C\beta^2$ 92 when $\beta$ is small. Using the coordinates of the points $(\beta, \phi)$ from FIG. 15, the coordinates can be fit to a quadratic function $\phi(\beta)=1-C\beta^2$.

Generally, when clock jitter is present in timer 12, the BER performance at receiver 8 will be impaired. In order to analyze clock jitter effects, the number of frames is set equal to one, i.e. $N_f$=1. At transmitter 4A, pulse shaper 19 is given according to equation (44). The template signal at receiver 6 is then given according to equation (45) with $\tilde{p}(t)$ given according to equation (46) where $\{\epsilon_k\}_{k=0}^{M-1}$ represents clock jitter errors. Clock jitter errors are modeled as being independent uniformly distributed over the interval [-$\beta$, $\beta$]. Importantly, each tap can experience different clock jitter. The decision statistic of the $n^{th}$ transmitted information symbol is given according to equation (47). Thus, the average received SNR γ is calculated according to equation (48) for $\Delta \geq T_p$. The expectation of the average received SNR is given according to equation (49) and is taken over $\{\epsilon_k\}_{k=0}^{M-1}$.

$$p(t) = \sum_{k=0}^{M-1} w[k]g(t - kT_0) \quad (44)$$

$$v(t) = \tilde{p}(t) - \tilde{p}(t-\Delta) \quad (45)$$

$$\tilde{p}(t) = \sum_{k=0}^{M-1} w[k]g(t - kT_0 - \epsilon_k) \quad (46)$$

$$r_n = (1/\sqrt{\epsilon_p})\{\int p(t-nT_s-s(n)\Delta)v(t-nT_s)dt + \int n(t)v(t-nT_s)dt\} \quad (47)$$

$$\gamma = \frac{\varepsilon}{N_0}\phi(\beta) \quad (48)$$

$$\phi(\beta) := E\left\{\frac{\left[\int p(t)\tilde{p}(t)dt\right]^2}{\int p^2(t)dt \int \tilde{p}^2(t)dt}\right\} \quad (49)$$

Proposition 2 establishes an approximate measure of the received SNR and is based on the simulations of the average BER performance of system 2 in the presence of clock jitter.

Proposition 2 In a single-user UWB link over AWGN channels, and small clock jitter uniformly distributed over [-β, β] with β << $T_g$, the average received SNR γ can be approximated by equation (50) where C is a non-negative constant given according to equation (51) and A is a matrix given according to equation (54).

$$\gamma = \frac{\varepsilon}{N_0}[1 - C\beta^2 + O(\beta^3)] \quad (50)$$

$$C = -\text{Trace}(A) \quad (51)$$

The proof of Proposition 2 is given in the following analysis. Set $\phi(\beta) = E\{\kappa\}$ where κ is defined according to equation (52).

$$\kappa(\epsilon_0, \cdots, \epsilon_{M-1}) = \frac{\left[\int p(t)\tilde{p}(t)dt\right]^2}{\int p^2(t)dt \int \tilde{p}^2(t)dt} \quad (52)$$

When the clock jitters $\{\epsilon_k\}_{k=0}^{M-1}$ are small, $\kappa(\epsilon_0, \ldots, \epsilon_{M-1})$ can be expanded using Taylor series according to equation (53) where $\epsilon := (\epsilon_0, \ldots, \epsilon_{M-1})^T$, and A is an M×M matrix given according to equation (54).

$$\kappa(\epsilon_0, \cdots, \epsilon_{M-1}) = \kappa(0, \cdots, 0) + \epsilon^T \nabla \kappa(0, \cdots, 0) + \frac{1}{2}\epsilon^T A\epsilon + O(\epsilon^3) \quad (53)$$

$$A := \begin{bmatrix} \frac{\partial^2 \kappa}{\partial \epsilon_0^2} & \frac{\partial^2 \kappa}{\partial \epsilon_0 \partial \epsilon_1} & \cdots & \frac{\partial^2 \kappa}{\partial \epsilon_0 \partial \epsilon_{M-1}} \\ \frac{\partial^2 \kappa}{\partial \epsilon_1 \partial \epsilon_0} & \frac{\partial^2 \kappa}{\partial \epsilon_1^2} & \cdots & \frac{\partial^2 \kappa}{\partial \epsilon_1 \partial \epsilon_{M-1}} \\ & & \ddots & \\ \frac{\partial^2 \kappa}{\partial \epsilon_{M-1} \partial \epsilon_0} & \frac{\partial^2 \kappa}{\partial \epsilon_{M-1} \partial \epsilon_1} & \cdots & \frac{\partial^2 \kappa}{\partial \epsilon_{M-1}^2} \end{bmatrix}_{(0,\cdots,0)} \quad (54)$$

It can be verified that the gradient of κ at (0, ..., 0) is zero; i.e., $\nabla \kappa(0, \ldots, 0) = 0$. Schwarz's inequality requires A to be negative semi-definite. Considering that $\{\epsilon_k\}_{k=0}^{M-1}$ are independent and identically distributed uniformly over [-β, β], equation (55) is obtained where C = -Trace(A) is a nonnegative number for Trace(A)≦0, since A is a negative semi-definite matrix.

$$E\{\kappa\} = 1 + \text{Trace}(A)E\{\epsilon_0^2\} + E\{O(\epsilon_0^3)\} = 1 - C\beta^2 + O(\beta^3) \quad (55)$$

Equation (55) implies that as long as the clock jitter is much smaller than $T_g$, the function $\phi(\beta)$ in equation (43) satisfies $1 - \phi(\beta) \propto \beta^2$, where β is the upper bound of the clock jitter. Therefore, when the clock jitter β remains small, equation (44) shows that clock jitter does not lead to major reduction received SNR. The simulation illustrated in FIG. 13 support the robustness of the pulse shape design described herein to clock jitter.

As clock jitter is present in baseband designs, frequency jitter is present in multi-carrier designs as well. The average received SNR is related to the CFJ $f_J$ as given according to equation (56) where $\gamma_0$ represents the SNR without CFJ/CFO and $f_J$ is assumed to be uniformly distributed over the interval [-ξ₀, ξ₀]. It follows from equation (56) that the average received SNR can be given according to equation (57) where $\phi(\xi_0 t)$ is given according to equation (58).

$$\gamma = \gamma_0 E\{\cos^2(2\pi f_J t)\} \quad (56)$$

$$\gamma = \gamma_0 \varphi(\xi_0 t) \quad (57)$$

$$\varphi(\xi_0 t) := \left(\frac{1}{2} + \frac{\sin(4\pi \xi_0 t)}{8\pi \xi_0 t}\right) \quad (58)$$

From equation (58), it can be determined that even a small CFJ can cause substantial degradation in the average SNR as t increases.

FIG. 16 is a graph illustrating BER performance of transmitter 4A in FIG. 2 for different pulses in the absence of NBI. In particular, the BER performance of UWB communication system 2 in the presence of additive white Gaussian noise (AWGN) 100 is compared with two different pulse shapers. The first pulse shaper 102 is the pulse shaper designed in FIG. 10A, 10B, i.e. single-band UWB communication with clock rate $T_0 = 35.7$ ps, while the second pulse shaper 104 is the widely adopted Gaussian monocycle with $f_g = 6.85$ GHz for single-band UWB communication with clock rate $T_0 = 35.7$ ps. FIG. 16 illustrates that the pulse shaper designed using the techniques described herein. Pulse shaper 102 has BER performance approximately equal to conventional pulse shaper 104 in the absence of NBI.

The pulse shaper p(t) was designed to approximate the FT mask M(f) in the previous designs with minimal pulse energy in the 0.96-3.1 GHz frequency bands to mitigate the interference caused by, and to, narrow-band systems transmitting over the specified frequency bands, i.e. GPS systems and systems communicating using the 802.11b/g standards. Letting the PSD of the NBI within this frequency band be $J_0=10N_0$, where $N_0$ is the PSD level of the AWGN. The multipath channel is generated according to the channel described in A. A. M. Saleh and R. A. Valenzuela "A Statistical Model for Indoor Multipath Propagation," IEEE Journal on Selected Areas in Communications, Vol. 5, No. 2, February 1987, pp. 128-137, which is incorporated herein by reference, with parameters $(\Lambda, \lambda, \Gamma, \gamma)$=90.0233 ns$^{-1}$, 2.5 ns$^{-1}$, 7.1 ns, 4.3 ns) for an indoor channel with line of sight (LOS) described in IEEE P802.15 Working Group for WPAN, Channel Modeling Sub-Committee Report Final, IEEE P802.15-02/368r5-SG3a, November 2002. At transmitter 4A, the modulate signals are given according to equation (1) with $N_f$=32, $\Delta$=1.5 ns, $T_c$=4 ns, and $T_f$=100 ns. At receiver 8, a 16 finger Rake Receiver with spacing$\geq$2 ns. MRC was employed to combine all fingers' outputs.

Figure 17:
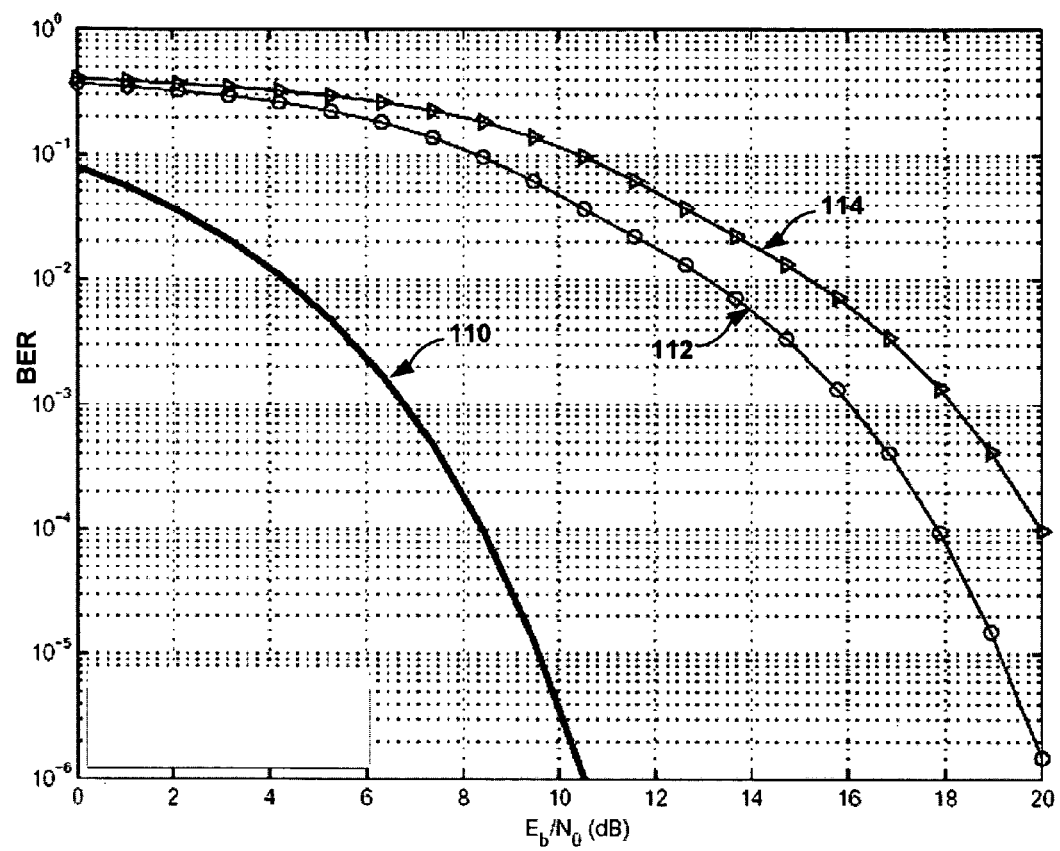
FIG. 17 is a graph illustrating BER performance of the transmitter in FIG. 2 for different pulses in the presence NBI.

FIG. 17 is a graph illustrating BER performance of transmitter 4A in FIG. 2 for different pulses in the presence NBI. In particular, the BER performance of UWB communication system 2 in the presence of additive white Gaussian noise (AWGN) 110 is compared with two different pulse shapers. The first pulse shaper 112 is the pulse shaper designed in FIG. 10A, 10B, i.e. single-band UWB communication with clock rate $T_0$=35.7 ps, while the second pulse shaper 114 is the widely adopted Gaussian monocycle with $f_g$=6.85 GHz for single-band UWB communication with clock rate $T_0$=35.7 ps. Pulse shaper 112 clearly has improved BER performance in comparison to conventional pulse shaper 114.

The pulse shaper p(t) was designed to approximate the FT mask M(f) in the previous designs with minimal pulse energy in the 0.96-3.1 GHz frequency bands to mitigate the interference caused by, and to, narrow-band systems transmitting over the specified frequency bands, i.e. GPS systems and systems communicating using the 802.11b/g standards. Letting the PSD of the NBI within this frequency band be $J_0=1N_0$, where $N_0$ is the PSD level of the AWGN. The multipath channel is generated according to the channel described in A. A. M. Saleh and R. A. Valenzuela "A Statistical Model for Indoor Multipath Propagation," IEEE Journal on Selected Areas in Communications, Vol. 5, No. 2, February 1987, pp. 128-137, which is incorporated herein by reference, with parameters $(\Lambda, \lambda, \Gamma, \gamma)$=90.0233 ns$^{-1}$, 2.5 ns$^{-1}$, 7.1 ns, 4.3 ns) for an indoor channel with line of sight (LOS) described in IEEE P802.15 Working Group for WPAN, Channel Modeling Sub-Committee Report Final, IEEE P802.15-02/368r5-SG3a, November 2002. At transmitter 4A, the modulate signals are given according to equation (1) with $N_f$=32, $\Delta$=1.5 ns, $T_c$=4 ns, and $T_f$=100 ns. At receiver 8, a 16 finger Rake Receiver with spacing$\geq$2 ns. MRC was employed to combine all fingers' outputs.

Various embodiments of the invention have been described. In particular, techniques for filtering ultra-wide band (UWB) pulses to substantially maximize power in one or more frequency bands of a UWB spectrum have been described. The techniques may be used to improve power and performance according to any of a wide variety of NBI events or various governmentally regulated frequency bands. For example, digitally filtering the UWB pulses to reduce power in one or more NBI frequency bands of the UWB spectrum may be performed specifically for one or more governmentally licensed frequency bands, including the 5 GHz band, or other bands either currently regulated or licensed by a government or regulated/licensed at some future date. In other words, the invention may be directed to a method or digital filter that comprises digitally filtering ultrawide band (UWB) pulses to reduce power in one or more governmentally regulated frequency bands, such as the 5 GHz frequency band that overlaps with the current UWB spectrum. As governmental regulations change, the invention provides great flexibility to adapt to such changes. These and other embodiments are within the scope of the following claims.

The invention claimed is:

1. A method comprising generating digitally filtered ultra-wide band (UWB) pulses to substantially maximize power in one or more frequency bands of a UWB spectrum and to substantially reduce power in one or more narrow band interference (NBI) frequency bands of the UWB spectrum, wherein generating the digitally filtered UWB pulses comprises:

generating a stream of information bearing symbols;
selecting spacing of a set of tap coefficients of a digital filter, the digital filter being included within a UWB transmitter;
selecting the set of tap coefficients based on the one or more frequency bands;
digitally filtering the stream of information bearing symbols according to the set of selected tap coefficients; and
generating, by the UWB transmitter, the digitally filtered UWB pulses based on the following equation:

$$p(t) = \sum_{n=0}^{M-1} w[n]g(t-nT_0),$$

where w[n] represents the n$^{th}$ tap coefficient, $T_0$ represents the spacing of the coefficients, M represents the number of tap coefficients, g(t) represents analog pulse shaping, and p(t) represents the digitally filtered UWB pulses.

2. The method of claim 1, further comprising generating digitally filtered UWB pulses to substantially maximize bandwidth in the one or more frequency bands of the UWB spectrum.

3. The method of claim 1, wherein g(t) represents a Gaussian monocycle.

4. The method of claim 1, wherein the set of tap coefficients are selected according to a Parks-McClellan algorithm.

5. The method of claim 1, wherein the set of tap coefficients are selected according to the following equation:

$$\min_{\{w_0[n]\}_{n=0}^{L}} \left\{ \max_{F \in \zeta} |e(F)| \right\},$$

where $\{w_0[n]\}_{n=0}^{L}$ represents the set of tap coefficients, $w_0[n]$ represents the n$^{th}$ tap coefficient, e(F) represents an error function that approximates error between the one or more frequency bands and an approximation of the one or more frequency bands and is a function of the frequency of the UWB pulses F, and $\zeta$ represents the union of disjoint intervals in the one or more frequency bands.

6. The method of claim 1, wherein the one or more frequency bands of the UWB spectrum comprise at least one of frequency bands within a Federal Communications Commission (FCC) spectral mask for the UWB spectrum, a frequency sub-band of the UWB spectrum, and at least two frequency sub-bands of the UWB spectrum.

7. The method of claim 1, wherein the one or more NBI frequency bands comprise a governmentally licensed frequency band within the UWB spectrum.

8. The method of claim 1, wherein the one or more NBI frequency bands comprise at least one of a 5 GHz frequency band, a frequency band including wireless communications from wireless local area networks (WLAN), a frequency band having heavy traffic, and a frequency band including co-existing wireless communication systems.

9. The method of claim 1, further comprising generating the digitally filtered UWB pulses according to a frequency hopping (FH) scheme, including substantially maximizing power of at least a portion of a given one of the pulses when the given one of the pulses falls within a selected FH frequency band and reducing the power of the given one of the pulses when the given one of the pulses falls outside the selected FH frequency band.

10. The method of claim 1, wherein the digitally filtered UWB pulses substantially maximize power and bandwidth in a Federal Communications Commission (FCC) spectral mask for the UWB spectrum while reducing power in a 5 GHz frequency band.

11. A digital filter of an ultra-wideband (UWB) transmitter that generates digitally filtered UWB pulses to substantially maximize power in one or more frequency bands of a UWB spectrum and to substantially reduce power in one or more narrow band interference (NBI) frequency bands of the UWB spectrum, wherein the digital filter generates the digitally filtered UWB pulses at least by:
adaptively selecting a set of tap coefficients based on the one or more frequency bands;
digitally filtering a stream of information bearing symbols according to the selected set of tap coefficients; and
generating the digitally filtered UWB pulses based on the following equation:

$$p(t) = \sum_{n=0}^{M-1} w[n]g(t-nT_0),$$

where $w[n]$ represents a $n^{th}$ tap coefficient, $T_0$ represents spacing of the coefficients, M represents a number of the tap coefficients, $g(t)$ represents analog pulse shaping, and $p(t)$ represents the digitally filtered UWB pulses.

12. The digital filter of claim 11, wherein the digital filter generates the digitally filtered UWB pulses to substantially maximize bandwidth in the one or more frequency bands of the UWB spectrum.

13. The digital filter of claim 11, wherein $g(t)$ represents a Gaussian monocycle.

14. The digital filter of claim 11, wherein the one or more NBI frequency bands comprise a governmentally licensed frequency band within the UWB spectrum.

15. The digital filter of claim 11, wherein the one or more NBI frequency bands comprise at least one of a 5 GHz frequency band, a frequency band including wireless communications from wireless local area networks (WLAN), a frequency band having heavy traffic, and a frequency band including co-existing wireless communication systems.

16. The digital filter of claim 11, wherein the digital filter digitally filters the UWB pulses such that an effective shape of the pulses following conversion to analog and analog shaping substantially exploits allocated power and frequency defined by a governmentally regulated mask associated with UWB communication.

17. The digital filter of claim 11, wherein the one or more narrow band interference (NBI) frequency bands comprise unlicensed frequency bands that include interference.

18. The digital filter of claim 11, wherein the digital filter digitally filters a plurality of UWB pulses according to a frequency hopping scheme, including reducing power of at least a portion of a given one of the pulses when the given one of the pulses falls within one or more governmentally regulated frequency bands.

19. The digital filter of claim 11, wherein the digital filter digitally filters the UWB pulses according to a frequency hopping (FH) scheme, including substantially maximizing power of at least a portion of a given one of the pulses when the given one of the pulses falls within a selected FH frequency band and reducing the power of the given one of the pulses when the given one of the pulses falls outside the selected frequency band.

20. The digital filter of claim 11, wherein the digitally filtered UWB pulses substantially maximize power and bandwidth in a Federal Communications Commission (FCC) spectral mask for the UWB spectrum while reducing power in a 5 GHz frequency band.

21. The digital filter of claim 11, wherein the digital filter comprises a shift register, wherein the shift register stores the set of tap coefficients.

22. The digital filter of claim 19, wherein the digital filter comprises a set of shift registers, each of the shift registers storing a set of tap coefficients for a selected frequency band of a frequency hopping (FH) scheme.

23. An ultra-wideband (UWB) transmitter comprising:
a symbol generator that generates a stream of information bearing symbols;
a digital filter that digitally filters the stream of information bearing symbols according to a set of tap coefficients to substantially maximize power in one or more frequency bands of a UWB spectrum and to substantially reduce power in one or more narrow band interference (NBI) frequency bands of the UWB spectrum, wherein the digital filter:
selects spacing of the set of tap coefficients;
selects the set of tap coefficients based on the one or more frequency bands; and
digitally filters the stream of information bearing symbols according to the selected set of tap coefficients;
a timer that processes the stream of information bearing symbols in accordance with a pulse position modulation (PPM) scheme; and
a pulse generator that generates digitally filtered ultra-wideband (UWB) pulses based on the following equation:

$$p(t) = \sum_{n=0}^{M-1} w[n]g(t-nT_0),$$

where $w[n]$ represents an $n^{th}$ tap coefficient, $T_0$ represents spacing of the coefficients, M represents a number of the tap coefficients, $g(t)$ represents analog pulse shaping, and $p(t)$ represents the digitally filtered UWB pulses.

24. The UWB transmitter of claim 23, wherein the digital filter digitally filters the stream of information bearing symbols to substantially maximize bandwidth in the one or more frequency bands of the UWB spectrum.

25. The UWB transmitter of claim 23, wherein $g(t)$ represents a Gaussian monocycle.

26. The UWB transmitter of claim 23, wherein the digital filter digitally filters the UWB pulses such that an effective shape of the pulses following conversion to analog and analog shaping substantially exploits allocated power and frequency defined by a governmentally regulated mask associated with ultrawide band (UWB) communication.

27. The UWB transmitter of claim 23, wherein the one or more NBI frequency bands comprise a governmentally licensed frequency band within the UWB spectrum.

28. The UWB transmitter of claim 23, wherein the one or more NBI frequency bands comprise at least one of a 5 GHz frequency band, a frequency band including wireless communications from wireless local area networks (WLAN), a frequency band having heavy traffic, and a frequency band including co-existing wireless communication systems.

29. The UWB transmitter of claim 23, wherein the one or more NBI frequency bands comprise a non-licensed frequency band within the UWB spectrum that includes substantial interference.

30. The UWB transmitter of claim 23, wherein the digital filter digitally filters a plurality of UWB pulses according to a frequency hopping scheme, including reducing power of at least a portion of a given one of the pulses when the given one of the pulses falls within one or more governmentally regulated frequency bands.

31. The UWB transmitter of claim 23, wherein the digital filter digitally filters the stream of information bearing symbols according to a frequency hopping (FH) scheme, including substantially maximizing power of at least a portion of a given one of the pulses when the given one of the pulses falls within the selected FH frequency band and reducing the power of the given one of the pulses when the given one of the pulses falls outside the selected FH frequency band.

32. The UWB transmitter of claim 23, wherein the digitally filtered UWB pulses substantially maximize power and bandwidth in a Federal Communications Commission (FCC) spectral mask for the UWB spectrum.

33. The UWB transmitter of claim 23, wherein the digital filter comprises a shift register, wherein the shift register stores the set of tap coefficients.

34. The UWB transmitter of claim 31, wherein the digital filter comprises a set of shift registers, each of the shift registers storing a set of tap coefficients for a selected frequency band of a frequency hopping (FH) scheme.

35. A method comprising digitally filtering ultrawide band (UWB) pulses to reduce power in one or more narrow band interference (NBI) frequency bands of a governmentally defined UWB spectrum, wherein digitally filtering the UWB pulses comprises:
selecting spacing of a set of tap coefficients of a digital filter, the digital filter being included within a UWB transmitter;
selecting the set of tap coefficients based on one or more frequency bands of the UWB spectrum;
digitally filtering a stream of information bearing symbols according to the set of selected tap coefficients; and
digitally filtering, by the UWB transmitter, the UWB pulses based on the following equation:

$$p(t) = \sum_{n=0}^{M-1} w[n]g(t - nT_0),$$

where w[n] represents the $n^{th}$ tap coefficient, $T_0$ represents the spacing of the coefficients, M represents the number of tap coefficients, g(t) represents analog pulse shaping, and p(t) represents the digitally filtered UWB pulses.

36. The method of claim 35, further comprising digitally filtering the UWB pulses to substantially maximize power in the one or more frequency bands of the UWB spectrum.

37. The method of claim 35, further comprising digitally filtering the UWB pulses such that an effective shape of the pulses following conversion to analog and analog shaping substantially exploits allocated power and frequency defined by a governmentally regulated mask associated with UWB communication.

38. The method of claim 37, wherein the analog shaping comprises Gaussian pulse shaping.

39. The method of claim 35, wherein the one or more NBI frequency bands comprise governmentally regulated frequency bands that a government licenses.

40. The method of claim 35, wherein the one or more NBI frequency bands comprise unlicensed frequency bands that include interference.

41. The method of claim 35, further comprising digitally filtering a plurality of UWB pulses according to a frequency hopping scheme, including reducing power of at least a portion of a given one of the pulses when the given one of the pulses falls within one or more of the governmentally regulated frequency bands.

42. A digital filter of an ultrawide band (UWB) transmitter that digitally filters a plurality of UWB pulses to reduce power in one or more narrow band interference (NBI) frequency bands of a governmentally defined UWB spectrum, wherein the digital filter generates the digitally filtered UWB pulses at least by:
adaptively selecting a set of tap coefficients based on one or more frequency bands of the UWB spectrum;
digitally filtering a stream of information bearing symbols according to the selected set of tap coefficients; and
generating the digitally filtered UWB pulses based on the following equation:

$$p(t) = \sum_{n=0}^{M-1} w[n]g(t - nT_0),$$

where w[n] represents the $n^{th}$ tap coefficient, $T_0$ represents the spacing of the coefficients, M represents the number of tap coefficients, g(t) represents analog pulse shaping, and p(t) represents the digitally filtered UWB pulses.

43. The digital filter of claim 42, wherein the digital filter digitally filters the UWB pulses to substantially maximize power in the one or more frequency bands of the UWB spectrum.

44. The digital filter of claim 42, wherein the digital filter digitally filters the UWB pulses such that an effective shape of the pulses following conversion to analog and analog shaping substantially exploits allocated power and frequency defined by a governmentally regulated mask associated with UWB communication.

45. The digital filter of claim 42, wherein the one or more narrow band interference (NBI) frequency bands comprise governmentally regulated frequency bands that a government licenses.

46. The digital filter of claim 42, wherein the one or more narrow band interference (NBI) frequency bands comprise unlicensed frequency bands which include interference.

47. The digital filter of claim 42, wherein the digital filter digitally filters the UWB pulses according to a frequency hopping scheme, including reducing power of at least a portion of a given one of the pulses when the given one of the pulses falls within one or more of the governmentally regulated frequency bands.

48. An ultrawide band (UWB) transmitter including a digital filter that digitally filters a plurality of UWB pulses to reduce power in one or more narrow band interference (NBI) frequency bands of a governmentally defined UWB spectrum, wherein the digital filter:

selects spacing of a set of tap coefficients;

selects the set of tap coefficients based on one or more frequency bands of the UWB spectrum; and digitally filters a stream of information bearing symbols according to the selected set of tap coefficients, wherein the digital filter digitally filters the UWB pulses based on the following equation:

$$p(t) = \sum_{n=0}^{M-1} w[n]g(t - nT_0),$$

where $w[n]$ represents the $n^{th}$ tap coefficient, $T_0$ represents the spacing of the coefficients, M represents the number of tap coefficients, $g(t)$ represents analog pulse shaping, and $p(t)$ represents the digitally filtered UWB pulses.

49. The UWB transmitter of claim 48, wherein the digital filter digitally filters the UWB pulses to substantially maximize power in the one or more frequency bands of the UWB spectrum.

50. The UWB transmitter of claim 48, wherein the digital filter digitally filters the UWB pulses such that an effective shape of the pulses following conversion to analog and analog shaping substantially exploits allocated power and frequency defined by a governmentally regulated mask associated with UWB communication.

51. The UWB transmitter of claim 48, wherein the one or more NBI frequency bands comprise governmentally regulated frequency bands that a government licenses.

52. The UWB transmitter of claim 48, wherein the one or more NBI frequency bands comprise unlicensed frequency bands that include interference.

53. The UWB transmitter of claim 48, wherein the digital filter digitally filters the UWB pulses according to a frequency hopping scheme, including reducing power of at least a portion of a given one of the pulses when the given one of the pulses falls within one or more of the governmentally regulated frequency bands.

* * * * *